US009010090B2

(12) United States Patent
Bisaiji et al.

(10) Patent No.: US 9,010,090 B2
(45) Date of Patent: Apr. 21, 2015

(54) EXHAUST PURIFICATION SYSTEM OF INTERNAL COMBUSTION ENGINE

(75) Inventors: Yuki Bisaiji, Mishima (JP); Kohei Yoshida, Gotemba (JP); Mikio Inoue, Susono (JP); Kazuhiro Umemoto, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/263,272

(22) PCT Filed: Oct. 18, 2010

(86) PCT No.: PCT/JP2010/068785
§ 371 (c)(1),
(2), (4) Date: Oct. 6, 2011

(87) PCT Pub. No.: WO2012/053117
PCT Pub. Date: Apr. 26, 2012

(65) Prior Publication Data
US 2013/0195724 A1    Aug. 1, 2013

(51) Int. Cl.
*F01N 3/36*    (2006.01)
*B01D 53/94*    (2006.01)
(Continued)

(52) U.S. Cl.
CPC .......... *B01D 53/9495* (2013.01); *F01N 3/2073* (2013.01); *F01N 2240/30* (2013.01); *F01N 2290/10* (2013.01); *F01N 2610/03* (2013.01); *F02D 41/0275* (2013.01); *F02D 41/1408* (2013.01); *F02D 41/405* (2013.01);
(Continued)

(58) Field of Classification Search
USPC ........... 60/282, 285, 286, 287, 289, 295, 301, 60/303
See application file for complete search history.

(56) References Cited

U.S. PATENT DOCUMENTS 5,052,178 A    10/1991    Clerc et al.
5,057,483 A    10/1991    Wan
(Continued)

FOREIGN PATENT DOCUMENTS

CN    101454081 A    6/2009
CN    101600860 A    12/2009
(Continued)

OTHER PUBLICATIONS

Jan. 18, 2011 International Search Report issued in International Patent Application No. PCT/JP2010/068785.
(Continued)

*Primary Examiner* — Audrey K Bradley
*Assistant Examiner* — Jorge Leon, Jr.
(74) *Attorney, Agent, or Firm* — Oliff PLC

(57) ABSTRACT

In an internal combustion engine, inside of an engine exhaust passage, a hydrocarbon feed valve (15) and an exhaust purification catalyst (13) are arranged. The concentration of hydrocarbons which flow into the exhaust purification catalyst (13) is made to vibrate within 200 ppm or more predetermined amplitude and within a 5 second or more predetermined period. At this time, when a predetermined amount or more of $NO_x$ is stored in the exhaust purification catalyst (13) or can be stored, the concentration of hydrocarbons flowing into the exhaust purification catalyst (13) is temporarily increased to desorb $NO_x$ which is stored at the exhaust purification catalyst (13).

9 Claims, 16 Drawing Sheets

(51) Int. Cl.
  *F01N 3/20*  (2006.01)
  *F02D 41/02*  (2006.01)
  *F02D 41/40*  (2006.01)
  *F01N 3/08*  (2006.01)
  *F02D 41/14*  (2006.01)
  *F01N 3/035*  (2006.01)

(52) U.S. Cl.
  CPC ............. *Y02T 10/44* (2013.01); *F01N 3/0814* (2013.01); *F01N 3/0842* (2013.01); *F01N 3/0871* (2013.01); *F01N 3/206* (2013.01); *F01N 3/035* (2013.01); *F01N 2510/06* (2013.01); *F01N 2900/0422* (2013.01); *F01N 2900/1402* (2013.01); *F01N 2900/1614* (2013.01)

(56) References Cited

U.S. PATENT DOCUMENTS

| | | |
|---|---|---|
| 5,075,274 A | 12/1991 | Kiyohide et al. |
| 5,402,641 A | 4/1995 | Katoh et al. |
| 5,882,607 A | 3/1999 | Miyadera et al. |
| 6,109,024 A | 8/2000 | Kinugasa et al. |
| 6,327,851 B1* | 12/2001 | Bouchez et al. ............... 60/286 |
| 6,413,483 B1 | 7/2002 | Brisley et al. |
| 6,477,834 B1 | 11/2002 | Asanuma et al. |
| 6,667,018 B2 | 12/2003 | Noda et al. |
| 6,813,882 B2 | 11/2004 | Hepburn et al. |
| 6,854,264 B2 | 2/2005 | Elwart et al. |
| 6,877,311 B2 | 4/2005 | Uchida |
| 6,983,589 B2 | 1/2006 | Lewis et al. |
| 7,063,642 B1 | 6/2006 | Hu et al. |
| 7,073,325 B2 | 7/2006 | Nakatani et al. |
| 7,082,753 B2 | 8/2006 | Dalla Betta et al. |
| 7,111,456 B2 | 9/2006 | Yoshida et al. |
| 7,137,379 B2 | 11/2006 | Sasaki et al. |
| 7,146,800 B2 | 12/2006 | Toshioka et al. |
| 7,165,393 B2 | 1/2007 | Betta et al. |
| 7,299,625 B2 | 11/2007 | Uchida et al. |
| 7,332,135 B2 | 2/2008 | Gandhi et al. |
| 7,412,823 B2 | 8/2008 | Reuter et al. |
| 7,454,900 B2 | 11/2008 | Hayashi |
| 7,484,504 B2 | 2/2009 | Kato et al. |
| 7,506,502 B2 | 3/2009 | Nakano et al. |
| 7,549,284 B2 | 6/2009 | Iihoshi et al. |
| 7,703,275 B2 | 4/2010 | Asanuma et al. |
| 7,707,821 B1 | 5/2010 | Legare |
| 7,861,516 B2* | 1/2011 | Allansson et al. .............. 60/286 |
| 8,099,950 B2 | 1/2012 | Kojima et al. |
| 8,215,101 B2 | 7/2012 | Tsujimoto et al. |
| 8,261,532 B2 | 9/2012 | Fukuda et al. |
| 8,281,569 B2 | 10/2012 | Handa et al. |
| 8,434,296 B2 | 5/2013 | Wada et al. |
| 8,572,950 B2 | 11/2013 | Bisaiji et al. |
| 8,656,706 B2 | 2/2014 | Umemoto et al. |
| 8,671,667 B2 | 3/2014 | Bisaiji et al. |
| 8,679,410 B2 | 3/2014 | Umemoto et al. |
| 8,689,543 B2 | 4/2014 | Numata et al. |
| 8,695,325 B2 | 4/2014 | Bisaiji et al. |
| 2001/0052232 A1 | 12/2001 | Hoffmann et al. |
| 2002/0029564 A1* | 3/2002 | Roth et al. ..................... 60/286 |
| 2003/0010020 A1 | 1/2003 | Taga et al. |
| 2003/0040432 A1 | 2/2003 | Beall et al. |
| 2003/0101713 A1 | 6/2003 | Betta et al. |
| 2004/0045285 A1* | 3/2004 | Penetrante et al. ............. 60/286 |
| 2004/0050037 A1 | 3/2004 | Betta et al. |
| 2004/0055285 A1* | 3/2004 | Rohr et al. ..................... 60/295 |
| 2004/0154288 A1* | 8/2004 | Okada et al. ................... 60/286 |
| 2004/0175305 A1 | 9/2004 | Nakanishi et al. |
| 2004/0187477 A1 | 9/2004 | Okugawa et al. |
| 2005/0135977 A1 | 6/2005 | Park et al. |
| 2005/0147541 A1 | 7/2005 | Ajisaka et al. |
| 2006/0053778 A1 | 3/2006 | Asanuma et al. |
| 2006/0107657 A1 | 5/2006 | Bernler et al. |
| 2006/0153761 A1 | 7/2006 | Bandl-Konrad et al. |
| 2006/0286012 A1 | 12/2006 | Socha et al. |
| 2007/0016357 A1 | 1/2007 | Nakagawa et al. |
| 2007/0028601 A1 | 2/2007 | Duvinage et al. |
| 2007/0059223 A1 | 3/2007 | Golunski et al. |
| 2007/0089403 A1 | 4/2007 | Pfeifer et al. |
| 2007/0125073 A1 | 6/2007 | Reuter et al. |
| 2007/0151232 A1 | 7/2007 | Dalla Betta et al. |
| 2008/0022662 A1 | 1/2008 | Yan |
| 2008/0053073 A1 | 3/2008 | Kalyanaraman et al. |
| 2008/0102010 A1 | 5/2008 | Bruck et al. |
| 2008/0120963 A1 | 5/2008 | Morita et al. |
| 2008/0148711 A1 | 6/2008 | Takubo |
| 2008/0154476 A1 | 6/2008 | Takubo |
| 2008/0196398 A1 | 8/2008 | Yan |
| 2008/0223020 A1* | 9/2008 | Yoshida et al. ................ 60/286 |
| 2008/0276602 A1 | 11/2008 | McCabe et al. |
| 2009/0000277 A1 | 1/2009 | Yoshida et al. |
| 2009/0049824 A1 | 2/2009 | Kojima et al. |
| 2009/0049825 A1* | 2/2009 | Ohashi ........................... 60/285 |
| 2009/0049826 A1 | 2/2009 | Toshioka et al. |
| 2009/0077948 A1 | 3/2009 | Mondori et al. |
| 2009/0084091 A1 | 4/2009 | Tsujimoto et al. |
| 2009/0118121 A1 | 5/2009 | Sarai |
| 2009/0120072 A1 | 5/2009 | Dalla Betta et al. |
| 2009/0151332 A1 | 6/2009 | Toshioka et al. |
| 2009/0191108 A1 | 7/2009 | Blanchard et al. |
| 2009/0196811 A1 | 8/2009 | Yamashita et al. |
| 2009/0229251 A1 | 9/2009 | Kadowaki |
| 2009/0249768 A1* | 10/2009 | Asanuma et al. ............... 60/286 |
| 2009/0266057 A1 | 10/2009 | Tsujimoto et al. |
| 2009/0282809 A1 | 11/2009 | Toshioka |
| 2009/0288393 A1* | 11/2009 | Matsuno et al. ................ 60/286 |
| 2009/0313970 A1 | 12/2009 | Iida |
| 2010/0005873 A1 | 1/2010 | Katoh et al. |
| 2010/0055012 A1 | 3/2010 | Grisstede et al. |
| 2010/0107613 A1 | 5/2010 | Masuda et al. |
| 2010/0115923 A1 | 5/2010 | Tsujimoto et al. |
| 2010/0126148 A1* | 5/2010 | Morishima et al. ............. 60/287 |
| 2010/0132356 A1* | 6/2010 | Lee ............................. 60/605.2 |
| 2010/0154387 A1 | 6/2010 | Shibata et al. |
| 2010/0233051 A1 | 9/2010 | Grisstede et al. |
| 2010/0236224 A1 | 9/2010 | Kumar et al. |
| 2010/0242459 A1 | 9/2010 | Tsujimoto et al. |
| 2011/0041486 A1 | 2/2011 | Kato et al. |
| 2011/0047984 A1* | 3/2011 | Lee et al. ....................... 60/286 |
| 2011/0047988 A1 | 3/2011 | Lewis et al. |
| 2011/0113754 A1 | 5/2011 | Kohara et al. |
| 2011/0120100 A1 | 5/2011 | Yin et al. |
| 2011/0131952 A1 | 6/2011 | Onodera et al. |
| 2011/0173950 A1 | 7/2011 | Wan et al. |
| 2011/0209459 A1 | 9/2011 | Hancu et al. |
| 2012/0122660 A1 | 5/2012 | Andersen et al. |
| 2012/0124967 A1 | 5/2012 | Yang et al. |
| 2012/0124971 A1 | 5/2012 | Bisaiji et al. |
| 2012/0131908 A1 | 5/2012 | Bisaiji et al. |
| 2013/0000284 A1 | 1/2013 | Bisaiji et al. |
| 2013/0011302 A1 | 1/2013 | Bisaiji et al. |
| 2013/0022512 A1 | 1/2013 | Bisaiji et al. |

FOREIGN PATENT DOCUMENTS

| | | |
|---|---|---|
| EP | 1 033 479 A2 | 9/2000 |
| EP | 1 273 337 A1 | 1/2003 |
| EP | 1 371 415 A1 | 12/2003 |
| EP | 1 519 015 A2 | 3/2005 |
| EP | 1 710 407 A1 | 10/2006 |
| EP | 1 793 099 A1 | 6/2007 |
| EP | 1 911 506 A1 | 4/2008 |
| EP | 1 936 164 | 6/2008 |
| EP | 1 965 048 A1 | 9/2008 |
| EP | 2 063 078 A1 | 5/2009 |
| EP | 2 149 684 A1 | 2/2010 |
| EP | 2 239 432 | 10/2010 |
| EP | 2 460 989 A1 | 6/2012 |
| JP | A-04-200637 | 7/1992 |
| JP | A-H08-117601 | 5/1996 |
| JP | A-09-004437 | 1/1997 |
| JP | A-09-220440 | 8/1997 |

(56) References Cited

FOREIGN PATENT DOCUMENTS

| | | |
|---|---|---|
| JP | A-11-30117 | 2/1999 |
| JP | A-11-062559 | 3/1999 |
| JP | A-11-081994 | 3/1999 |
| JP | A-2000-257419 | 9/2000 |
| JP | A-2002-188429 | 7/2002 |
| JP | A-2004-16850 | 1/2004 |
| JP | A-2004-36543 | 2/2004 |
| JP | A-2004-216224 | 8/2004 |
| JP | A-2004-290965 | 10/2004 |
| JP | A-2004-308526 | 11/2004 |
| JP | A-2004-316458 | 11/2004 |
| JP | A-2005-61340 | 3/2005 |
| JP | A-2005-113801 | 4/2005 |
| JP | A-2005-171853 | 6/2005 |
| JP | A-2005-177738 | 7/2005 |
| JP | A-2006-501390 | 1/2006 |
| JP | A-2006-512529 | 4/2006 |
| JP | A-2006-342700 | 12/2006 |
| JP | 2007-064167 | 3/2007 |
| JP | 2007-514104 | 5/2007 |
| JP | A-2007-514090 | 5/2007 |
| JP | 2007-154794 | 6/2007 |
| JP | B2-3969450 | 9/2007 |
| JP | 2007-278120 | 10/2007 |
| JP | 2008-19760 | 1/2008 |
| JP | A-2008-002451 | 1/2008 |
| JP | A-2008-69769 | 3/2008 |
| JP | A-2008-231926 | 10/2008 |
| JP | A-2008-232003 | 10/2008 |
| JP | A-2008-255858 | 10/2008 |
| JP | 2008-267178 | 11/2008 |
| JP | A-2008-267217 | 11/2008 |
| JP | A-2008-286186 | 11/2008 |
| JP | 2008-543559 | 12/2008 |
| JP | A-2009-30560 | 2/2009 |
| JP | 2009-112967 | 5/2009 |
| JP | A-2009-114879 | 5/2009 |
| JP | 2009-165922 | 7/2009 |
| JP | 2009-167973 | 7/2009 |
| JP | 2009-168031 | 7/2009 |
| JP | A-2009-156067 | 7/2009 |
| JP | A-2009-191823 | 8/2009 |
| JP | 2009-243362 | 10/2009 |
| JP | A-2009-221939 | 10/2009 |
| JP | A-2009-226349 | 10/2009 |
| JP | 2009-275631 | 11/2009 |
| JP | 2009-275666 | 11/2009 |
| JP | 2010/012459 | 1/2010 |
| JP | A-2010-012459 | 1/2010 |
| JP | 2010-048134 | 3/2010 |
| JP | A-2011-190803 | 9/2011 |
| JP | B1-4868097 | 2/2012 |
| WO | WO 2005/059324 A1 | 6/2005 |
| WO | WO 2006/131825 | 12/2006 |
| WO | WO 2007/026229 | 3/2007 |
| WO | WO 2007/141638 | 12/2007 |
| WO | WO 2008/007810 | 1/2008 |
| WO | WO 2008/012653 A2 | 1/2008 |
| WO | WO 2009/016822 | 2/2009 |
| WO | WO 2009/056958 | 5/2009 |
| WO | WO 2009/082035 A1 | 7/2009 |
| WO | WO 2011/114499 A1 | 9/2011 |
| WO | WO 2011/114501 A1 | 9/2011 |
| WO | WO 2011/118044 A1 | 9/2011 |

OTHER PUBLICATIONS

Oct. 26, 2010 International Search Report issued in International Patent Application No. PCT/JP2010/063135.
Jan. 18, 2011 International Search Report issued in International Patent Application No. PCT/JP2010/067707.
Dec. 21, 2010 Search Report issued in International Patent Application No. PCT/JP2010/065449 (with translation).
Jan. 18, 2011 International Search Report issued in International Patent Application No. PCT/JP2010/067705.
U.S. Appl. No. 13/257,789 in the name of Nishioka et al., filed Oct. 14, 2011.
U.S. Appl. No. 13/264,062 in the name of Watanabe et al., filed Oct. 12, 2011.
U.S. Appl. No. 13/259,885 in the name of Umemoto et al., filed Sep. 23, 2011.
U.S. Appl. No. 13/260,986 in the name of Watanabe et al., filed Sep. 29, 2011.
Office Action dated Apr. 23, 2014 issued in U.S. Appl. No. 13/260,986.
Notice of Allowance dated Oct. 17, 2013 issued in U.S. Appl. No. 13/202,694.
Notice of Allowance dated Nov. 13, 2013 issued in U.S. Appl. No. 13/202,692.
Notice of Allowance dated Mar. 4, 2014 issued in U.S. Appl. No. 13/255,786.
Corrected Notice of Allowance dated Feb. 6, 2014 issued in U.S. Appl. No. 13/202,694.
Office Action dated May 7, 2014 issued in U.S. Appl. No. 13/264,062.
Aug. 13, 2013 International Preliminary Report on Patentability issued in Application No. PCT/JP2011/053429 (with translation).
Aug. 8, 2013 Office Action issued in U.S. Appl. No. 13/258,483.
Dec. 21, 2010 International Search Report issued in International Patent Application No. PCT/JP2010/065449 (with translation).
Dec. 27, 2011 International Search Report issued in International Patent Application No. PCT/JP2011/075618 (with translation).
Jun. 15, 2010 International Search Report issued in International Patent Application No. PCT/JP2010/054730 (with translation).
Jun. 29, 2010 International Search Report issued in International Application No. PCT/JP2010/055303 (with translation).
Nov. 22, 2010 International Search Report in International Patent Application No. PCT Application No. PCT/JP2010/065186 (with translation).
Jul. 14, 2014 Office Action issued in U.S. Appl. No. 13/262,001.
Jul. 14, 2014 Office Action issued in U.S. Appl. No. 13/264,884.
Jun. 16, 2014 Office Action issued in U.S. Appl. No. 13/581,186.
Jun. 18, 2014 Office Action issued in U.S. Appl. No. 13/582,909.
Jun. 19, 2014 Office Action issued in U.S. Appl. No. 13/264,594.
Jun. 21, 2011 International Search Report issued in Application No. PCT/JP2011/059880 (with translation).
Jun. 23, 2014 Office Action issued in U.S. Appl. No. 13/262,858.
Jun. 26, 2014 Office Action issued in U.S. Appl. No. 13/580,000.
Mar. 15, 2011 International Search Report issued in International Application No. PCT/JP2011/053429 (with translation).
Mar. 22, 2011 International Search Report issued in Application No. PCT/JP2010/073645 (with translation).
Mar. 22, 2011 International Search Report issued in International Patent Application No. PCT/JP2010/072299 (with translation).
Mar. 8, 2011 International Search Report issued in International Application No. PCT/JP2011/052969 (with translation).
May 15, 2013 Office Action in U.S. Appl. No. 13/202,694.
May 17, 2011 International Search Report issued in Application No. PCT/JP2011/057264 (with translation).
May 2, 2014 Office Action issued in U.S. Appl. No. 13/263,660.
Mar. 28, 2014 Notice of Allowance issued in U.S. Appl. No. 13/582,862.
Nov. 22, 2010 International Search Report issued in International Patent Application No. PCT/JP2010/065187.
Nov. 26, 2012 Office Action issued in U.S. Appl. No. 13/202,694.
Nov. 27, 2013 Notice of Allowance issued in U.S. Appl. No. 13/258,483.
Oct. 26, 2012 Office Action issued in U.S. Appl. No. 13/202,692.
Oct. 4, 2013 Notice of Allowance issued in U.S. Appl. No. 13/259,885.
Apr. 3, 2014 Office Action issued in U.S. Appl. No. 13/259,574.
Dec. 20, 2013 Office Action issued in U.S. Appl. No. 13/264,230.
Jul. 1, 2014 Office Action issued in U.S. Appl. No. 13/257,789.
May 8, 2014 Office Action issued in U.S. Appl. No. 13/375,674.
U.S. Appl. No. 13/202,692 in the name of Umemoto et al., filed Sep. 20, 2011.
U.S. Appl. No. 13/202,733 filed Sep. 30, 2011 in the name of Bisaui et al.

(56) References Cited

OTHER PUBLICATIONS

U.S. Appl. No. 13/258,483 in the name of Numata et al., filed Sep. 22, 2011.
U.S. Appl. No. 13/259,574 in the name of Tsukamoto et al., filed Sep. 23, 2011.
U.S. Appl. No. 13/262,858 in the name of Bisaiji et al., filed Oct. 4, 2011.
U.S. Appl. No. 13/263,660 in the name of Umemoto et al., filed Oct. 7, 2011.
U.S. Appl. No. 13/264,230 in the name of Bisadi et al. filed Oct. 13, 2011.
U.S. Appl. No. 13/264,594 filed Oct. 14, 2011 in the name of Inoue et al.
U.S. Appl. No. 13/264,884 in the name of Bisaiji et al., filed Oct. 17, 2011.
U.S. Appl. No. 13/375,674 filed Dec. 1, 2011 in the name of Inoue et al.
U.S. Appl. No. 13/578,148 in the name of Umemoto et al., filed Aug. 9, 2012.
U.S. Appl. No. 13/58,186, filed on Aug. 24, 2012, in the name of Kazuhiro Umemoto et al.
U.S. Appl. No. 13/580,000 in the name of Bisaiji et al., filed Aug. 20, 2012.
U.S. Appl. No. 13/582,862 filed Sep. 5, 2012 in the name of Uenishi et al.
U.S. Appl. No. 13/582,909, filed on Sep. 5, 2012, in the name of Kazuhiro Umemoto et al.
U.S. Appl. No. 13/202,694 in the name of Bisaui et al., filed Sep. 19, 2011.
U.S. Appl. No. 14/108,113 in the name of Bisaiji et al., filed Dec. 16, 2013.
U.S. Appl. No. 14/152,629 in the name of Umemoto et al., filed Jan. 10, 2014.
U.S. Appl. No. 13/262,001 in the name of Inoue et al., filed Oct. 19, 2011.
Nov. 22, 2010 Written Opinion for PCT Application No. PCT/JP2010/065186 (with translation).
Dec. 27, 2011 Written Opinion issued in International Patent Application No. PCT/JP2011/075618 (with translation).
Aug. 6, 2014 Notice of Allowance issued in U.S. Appl. No. 13/259,574.
Feb. 6, 2014 Corrected Notice of Allowance issued in U.S. Appl. No. 13/202,694.
Jul. 24, 2013 Office Action issued in U.S. Appl. No. 13/202,692.
Jun. 15, 2010 International Search Report issued in PCT/JP2010/054740 (with translation).
Jun. 15, 2010 International Search Report issued in International Patent Application No. PCT/JP2010/054731 (with translation).
Jun. 29, 2010 International Search Report issued in International Patent Application No. PCT/JP2010/056345.
Jun. 15, 2010 International Search Report issued in International Patent Application No. PCT/JP2010/054729.
Sep. 13, 2011 International Search Report issued in International Patent Application No. PCT/JP2011/066628 (with translation).
Jun. 20, 2012 Search Report issued in European Patent Application No. 10845966.0.
Apr. 4, 2013 Office Action issued in U.S. Appl. No. 13/255,710.
Oct. 24, 2013 Office Action issued in U.S. Appl. No. 13/255,710.
Jan. 17, 2013 Office Action issued in U.S. Appl. No. 13/202,733.
Jan. 22, 2014 Office Action issued in U.S. Appl. No. 13/499,211.
May 27, 2014 Office Action issued in U.S. Appl. No. 13/255,710.
Oct. 2, 2014 Office Action issued in U.S. Appl. No. 13/582,862.
Jun. 15, 2010 Written Opinion issued in PCT/JP2010/054740 (with translation).
Sep. 18, 2014 Notice of Allowance issued in U.S. Appl. No. 13/255,710.
Jul. 9, 2013 Notice of Allowance issued in U.S. Appl. No. 13/255,774.
Dec. 9, 2013 Notice of Allowance issued in U.S. Appl. No. 13/262,506.
Dec. 27, 2013 Notice of Allowance issued in U.S. Appl. No. 13/502,210.
U.S. Appl. No. 13/255,774 in the name of Bisaiji et al., filed Sep. 22, 2011.
U.S. Appl. No. 13/255,710 in the name of Bisaiji et at, filed Oct. 12, 2011.
U.S. Appl. No. 13/502,210 in the name of Bisaiji et al., filed Apr. 16, 2012.
U.S. Appl. No. 13/499,211 in the name of Bisaiji et al., filed Mar. 29, 2012.
U.S. Appl. No. 13/934,080 in the name of Bisaiji et al., filed Jul. 2, 2013.
U.S. Appl. No. 13/262,506 in the name of Bisaiji et al., filed Sep. 30, 2011.
U.S. Appl. No. 13/264,230 in the name of Bisaiji et al., filed Oct. 13, 2011.
U.S. Appl. No. 13/202,694 in the name of Bisaiji et al., filed Sep. 19, 2011.
U.S. Appl. No. 13/202,733 in the name of Bisaiji et al., filed Sep. 30, 2011.
Dec. 22, 2014 Office Action issued in U.S. Appl. No. 13/264,230.

* cited by examiner

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine which arranges, in an engine exhaust passage, an $NO_x$ storage catalyst which stores $NO_x$ which is contained in exhaust gas when the air-fuel ratio of the inflowing exhaust gas is lean and which releases the stored $NO_x$ when the air-fuel ratio of the inflowing exhaust gas becomes rich, which arranges, in the engine exhaust passage upstream of the $NO_x$ storage catalyst, an oxidation catalyst which has an adsorption function, and which feeds hydrocarbons into the engine exhaust passage upstream of the oxidation catalyst to make the air-fuel ratio of the exhaust gas flowing into the $NO_x$ storage catalyst rich when releasing $NO_x$ from the $NO_x$ storage catalyst (for example, see Patent Literature 1).

In this internal combustion engine, the hydrocarbons which are fed when releasing $NO_x$ from the $NO_x$ storage catalyst are made gaseous hydrocarbons at the oxidation catalyst, and the gaseous hydrocarbons are fed to the $NO_x$ storage catalyst. As a result, the $NO_x$ which is released from the $NO_x$ storage catalyst is reduced well.

CITATION LIST

Patent Literature

Patent Literature 1: Japanese Patent No. 3969450

SUMMARY OF INVENTION

Technical Problem

However, there is the problem that when the $NO_x$ storage catalyst reaches a high temperature, the $NO_x$ purification rate falls.

An object of the present invention is to provide an exhaust purification system of an internal combustion engine which can obtain a high $NO_x$ purification rate even if the temperature of the exhaust purification catalyst becomes a high temperature.

Solution to Problem

According to the present invention, there is provided an exhaust purification system of an internal combustion engine in which an exhaust purification catalyst for reacting $NO_x$ contained in exhaust gas and reformed hydrocarbons is arranged inside of an engine exhaust passage, a precious metal catalyst is carried on an exhaust gas flow surface of the exhaust purification catalyst and a basic exhaust gas flow surface part is formed around the precious metal catalyst, the exhaust purification catalyst has a property of reducing the $NO_x$ which is contained in exhaust gas if a concentration of hydrocarbons flowing into the exhaust purification catalyst is made to vibrate within a predetermined range of amplitude and within a predetermined range of period and has a property of being increased in storage amount of $NO_x$ which is contained in exhaust gas if the vibration period of the hydrocarbon concentration is made longer than the predetermined range, at the time of engine operation, if the concentration of hydrocarbons flowing into the exhaust purification catalyst is made to vibrate within the predetermined range of amplitude and within the predetermined range of period, and, at this time, when a predetermined amount or more of $NO_x$ is stored at or can be stored at the exhaust purification catalyst, the concentration of hydrocarbons flowing into the exhaust purification catalyst is temporarily increased to desorb $NO_x$ which is stored at the exhaust purification catalyst.

Advantageous Effects of Invention

Even if the temperature of the exhaust purification catalyst becomes a high temperature, a high $NO_x$ purification rate can be obtained.

DESCRIPTION OF EMBODIMENTS

Figure 1:
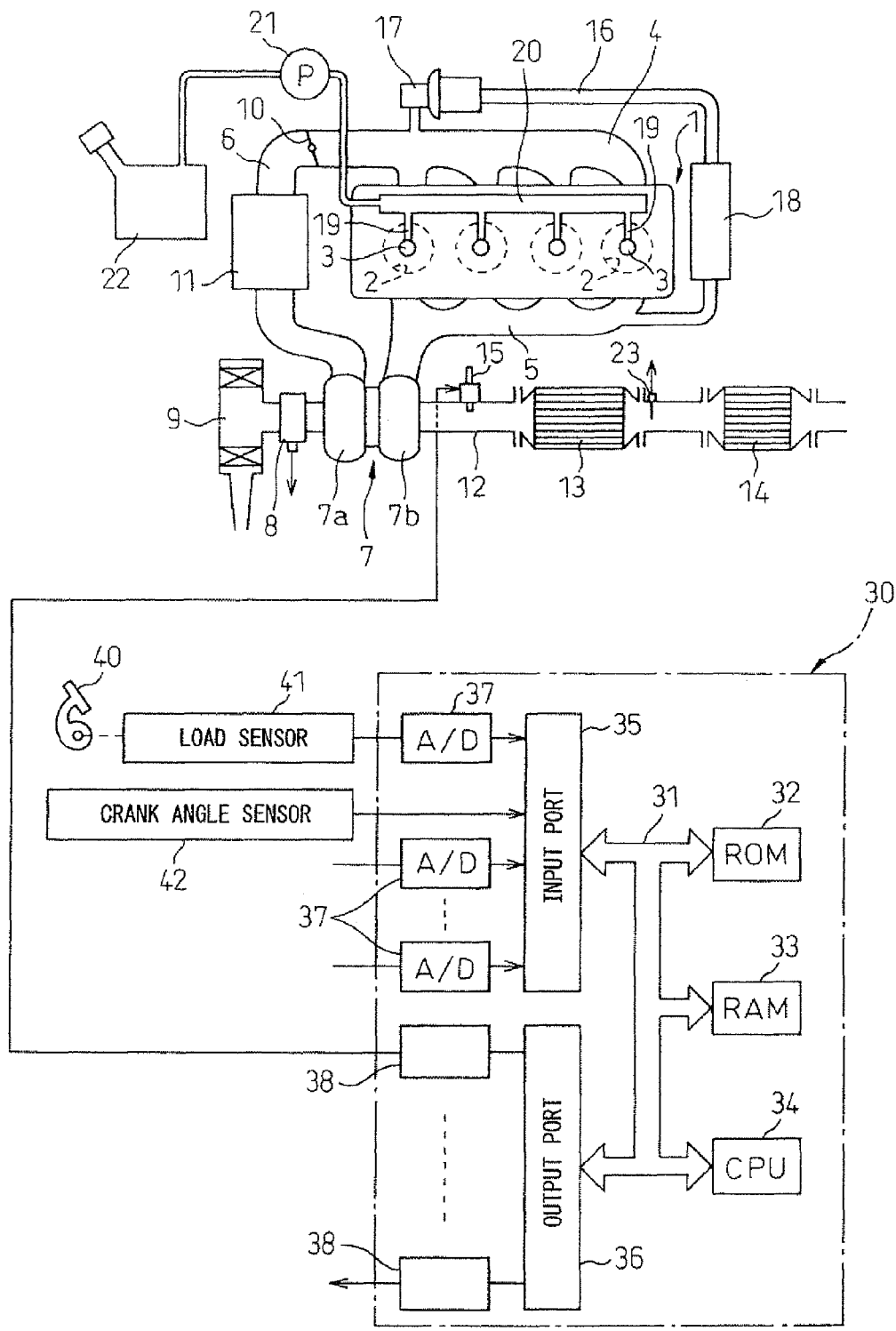
FIG. 1 is an overall view of a compression ignition type internal combustion engine.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 driven by a step motor is arranged. Furthermore, around the intake duct 6, a cooling device 11 is arranged for cooling the intake air which flows through the inside of the intake duct 6. In the embodiment shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7. The outlet of the exhaust turbine 7b is connected through an exhaust pipe 12 to an inlet of the exhaust purification catalyst 13, an outlet of the exhaust purification catalyst 13 is connected to a particulate filter 14 for trapping particulate which is contained in exhaust gas. Inside the exhaust pipe 12 upstream of the exhaust purification catalyst 13, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, an electronically controlled EGR control valve 17 is arranged. Further, around the EGR passage 16, a cooling device 18 is arranged for cooling EGR gas flowing through the inside of the EGR passage 16. In the embodiment shown in FIG. 1, the engine cooling water is guided to the inside of the cooling device 18 where the engine cooling water is used to cool the EGR gas. On the other hand, each fuel injector 3 is connected through a fuel feed tube 19 to a common rail 20. This common rail 20 is connected through an electronically controlled variable discharge fuel pump 21 to a fuel tank 22. The fuel which is stored inside of the fuel tank 22 is fed by the fuel pump 21 to the inside of the common rail 20. The fuel which is fed to the inside of the common rail 20 is fed through each fuel feed tube 19 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Downstream of the exhaust purification catalyst 13, a temperature sensor 23 for detecting the temperature of the exhaust purification catalyst 13 is attached. The output signals of this temperature sensor 23 and intake air amount detector 8 are input through respectively corresponding AD converters 37 to the input port 35. Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, step motor for driving the throttle valve 10, hydrocarbon feed valve 15, EGR control valve 17, and fuel pump 21.

Figure 2:
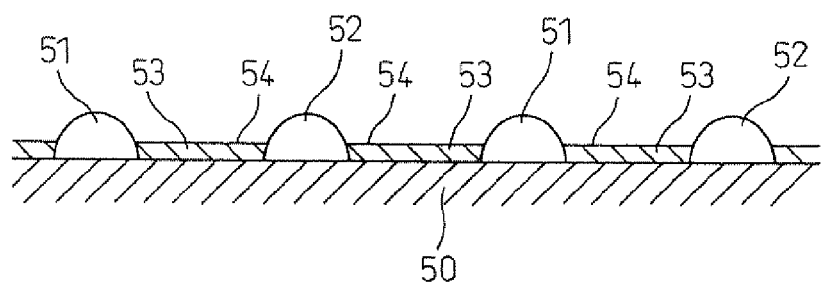
FIG. 2 is a view schematically showing a surface part of a catalyst carrier.

FIG. 2 schematically shows a surface part of a catalyst carrier which is carried on a substrate of the exhaust purification catalyst 13. At this exhaust purification catalyst 13, as shown in FIG. 2, for example, there is provided a catalyst carrier 50 made of alumina on which precious metal catalysts 51 and 52 are carried. Furthermore, on this catalyst carrier 50, a basic layer 53 is formed which includes at least one element selected from potassium K, sodium Na, cesium Cs, or another such alkali metal, barium Ba, calcium Ca, or another such alkaline earth metal, a lanthanoid or another such rare earth metal and silver Ag, copper Cu, iron Fe, iridium Ir, or another metal able to donate electrons to $NO_x$. The exhaust gas flows along the top of the catalyst carrier 50, so the precious metal catalysts 51 and 52 can be said to be carried on the exhaust gas flow surface of the exhaust purification catalyst 13. Further, the surface of the basic layer 53 exhibits basicity, so the surface of the basic layer 53 is called the basic exhaust gas flow surface part 54.

On the other hand, in FIG. 2, the precious metal catalyst 51 is comprised of platinum Pt, while the precious metal catalyst 52 is comprised of rhodium Rh. That is, the precious metal catalysts 51 and 52 which are carried on the catalyst carrier 50 are comprised of platinum Pt and rhodium Rh. Note that, on the catalyst carrier 50 of the exhaust purification catalyst 13, in addition to platinum Pt and rhodium Rh, palladium Pd may be further carried or, instead of rhodium Rh, palladium Pd may be carried. That is, the precious metal catalysts 51 and 52 which are carried on the catalyst carrier 50 are comprised of platinum Pt and at least one of rhodium Rh and palladium Pd.

Figure 3:
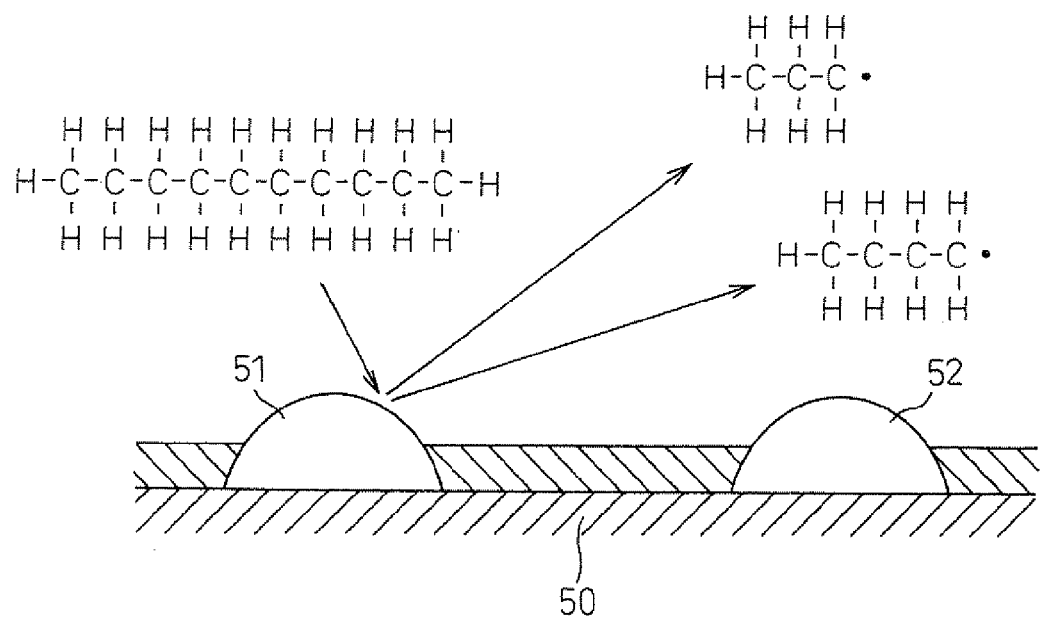
FIG. 3 is a view for explaining an oxidation reaction in an exhaust purification catalyst.

If hydrocarbons are injected from the hydrocarbon feed valve 15 into the exhaust gas, the hydrocarbons are reformed by the exhaust purification catalyst 13. In the present invention, at this time, the reformed hydrocarbons are used to remove the $NO_x$ at the exhaust purification catalyst 13. FIG. 3 schematically shows the reforming action performed at the exhaust purification catalyst 13 at this time. As shown in FIG. 3, the hydrocarbons HC which are injected from the hydrocarbon feed valve 15 become radical hydrocarbons HC with a small carbon number by the catalyst 51.

Note that, even if the fuel injector 3 injects fuel, that is, hydrocarbons, into the combustion chamber 2 in the second half of the expansion stroke or exhaust stroke, the hydrocarbons are reformed in the combustion chamber 2 or exhaust purification catalyst 13, and the $NO_x$ which is contained in exhaust gas is removed by the reformed hydrocarbons in the exhaust purification catalyst 13. Therefore, in the present invention, instead of feeding hydrocarbons from the hydrocarbon feed valve 15 to the inside of an engine exhaust passage, it is also possible to feed hydrocarbons into the combustion chamber 2 in the second half of the expansion stroke or exhaust stroke. In this way, in the present invention, it is possible to feed hydrocarbons into the combustion chamber 2, but below, the present invention will be explained with reference to the case of trying to inject hydrocarbons from a hydrocarbon feed valve 15 to the inside of an engine exhaust passage.

Figure 4:
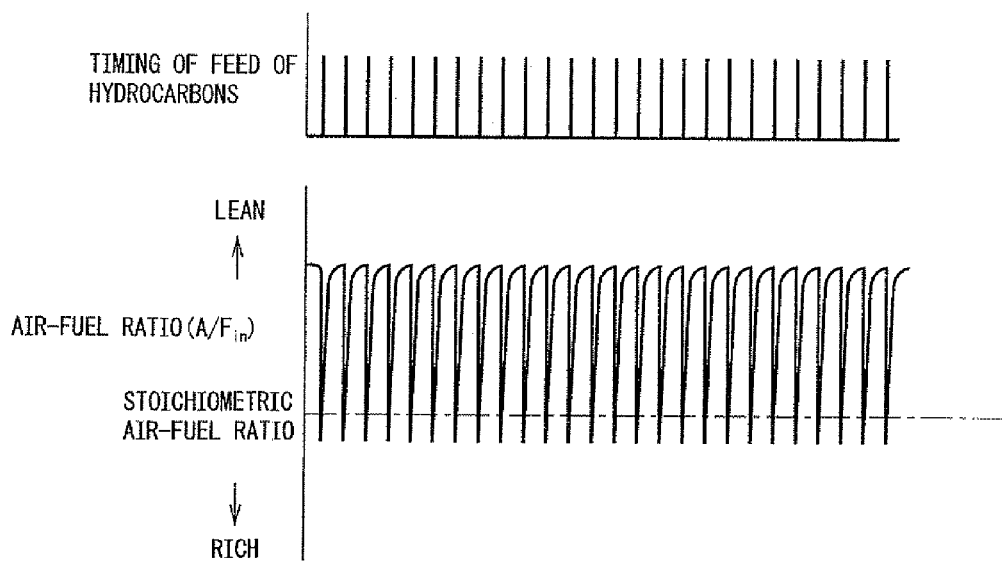
FIG. 4 is a view showing a change of an air-fuel ratio of exhaust gas flowing into an exhaust purification catalyst.

FIG. 4 shows the feed timing of hydrocarbons from the hydrocarbon feed valve 15 and the change in the air-fuel ratio (A/F) in of the exhaust gas which flows into the exhaust purification catalyst 13. Note that, the changes in the air-fuel ratio (A/F) in depend on the change in concentration of the hydrocarbons in the exhaust gas which flows into the exhaust purification catalyst 13, so it can be said that the change in the air-fuel ratio (A/F) in shown in FIG. 4 expresses the change in concentration of the hydrocarbons. However, if the hydrocarbon concentration becomes higher, the air-fuel ratio (A/F) in becomes smaller, so, in FIG. 4, the more to the rich side the air-fuel ratio (A/F) in becomes, the higher the hydrocarbon concentration.

Figure 5:
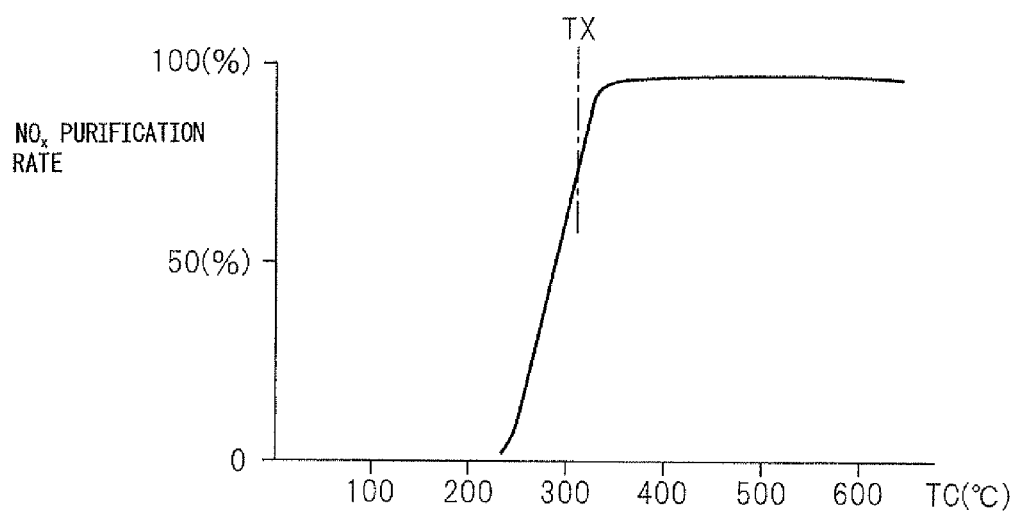
FIG. 5 is a view showing an $NO_x$ purification rate.

FIG. 5 shows the $NO_x$ purification rate by the exhaust purification catalyst 13 with respect to the catalyst temperatures of the exhaust purification catalyst 13 when periodically making the concentration of hydrocarbons flowing into the exhaust purification catalyst 13 change so as to, as shown in FIG. 4, make the air-fuel ratio (A/F) in of the exhaust gas flowing to the exhaust purification catalyst 13 change. The inventors engaged in research relating to $NO_x$ purification for a long time. In the process of research, they learned that if making the concentration of hydrocarbons flowing into the exhaust purification catalyst 13 vibrate within a predetermined range of amplitude and within a predetermined range of period, as shown in FIG. 5, an extremely high $NO_x$ purification rate is obtained even in a 400° C. or higher high temperature region.

Figure 6A:
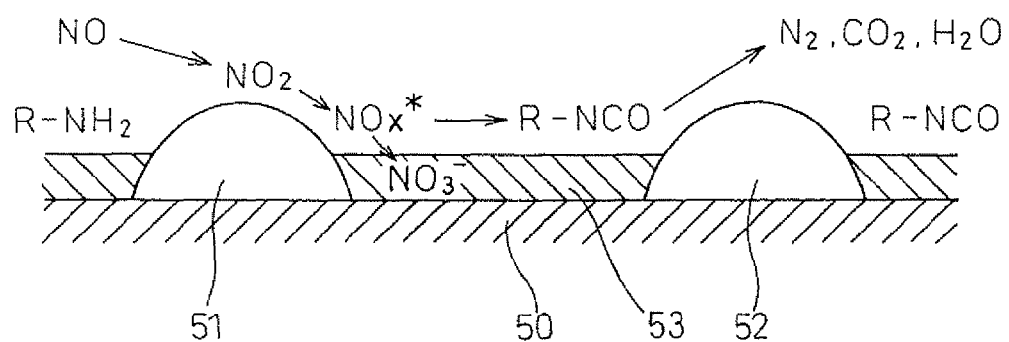
FIGS. 6A and 6B are views for explaining an oxidation reduction reaction in an exhaust purification catalyst.
Figure 6B:
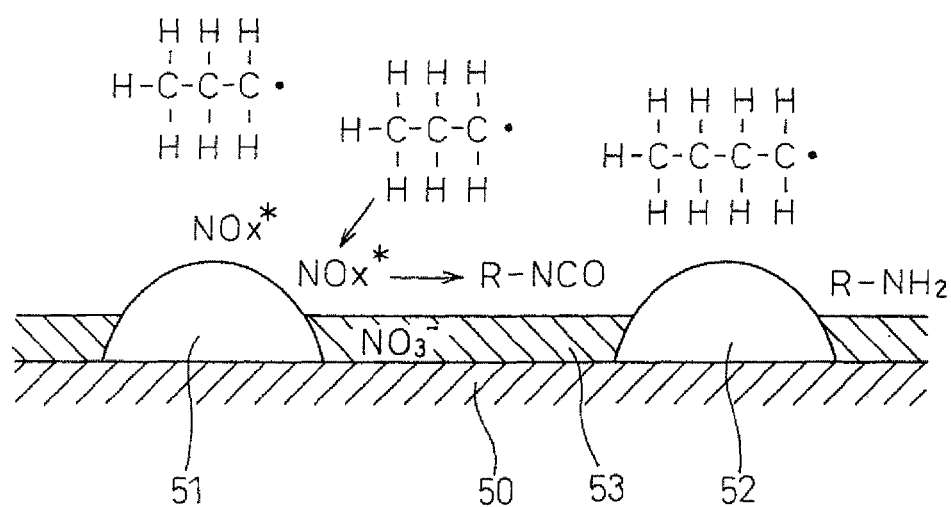

Furthermore, at this time, a large amount of reducing intermediate containing nitrogen and hydrocarbons continues to be held or adsorbed on the surface of the basic layer 53, that is, on the basic exhaust gas flow surface part 54 of the exhaust purification catalyst 13. It is learned that this reducing intermediate plays a central role in obtaining a high $NO_x$ purification rate. Next, this will be explained with reference to FIGS. 6A and 6B. Note that, these FIGS. 6A and 6B schematically show the surface part of the catalyst carrier 50 of the exhaust purification catalyst 13. These FIGS. 6A and 6B show the reaction which is presumed to occur when the concentration of hydrocarbons flowing into the exhaust purification catalyst 13 is made to vibrate within a predetermined range of amplitude and within a predetermined range of period.

FIG. 6A shows when the concentration of hydrocarbons flowing into the exhaust purification catalyst 13 is low, while FIG. 6B shows when hydrocarbons are fed from the hydrocarbon feed valve 15 and the concentration of hydrocarbons flowing into the exhaust purification catalyst 13 becomes higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. Therefore, the NO which is contained in the exhaust gas, as shown in FIG. 6A, is oxidized on the platinum 51 and becomes $NO_2$. Next, this $NO_2$ is further oxidized and becomes $NO_3$. Further, part of the $NO_2$ becomes $NO_2^-$. In this case, the amount of production of $NO_3$ is far greater than the amount of production of $NO_2^-$. Therefore, a large amount of $NO_3$ and a small amount of $NO_2^-$ are produced on the platinum Pt 51. These $NO_3$ and $NO_2^-$ are strong in activity. Below, these $NO_3$ and $NO_2^-$ are called $NO_x^*$.

Note that, at this time, depending on the engine operating state, as shown in FIG. 6A, part of the produced active $NO_x^*$ is stored in the form of nitrate ions $NO_3^-$ inside the basic layer 53. The storage action of the active $NO_x^*$ will be explained in detail later. The explanation will be omitted here.

On the other hand, if hydrocarbons are fed from the hydrocarbon feed valve 15, as shown in FIG. 3, the hydrocarbons are reformed and become radicalized inside of the exhaust purification catalyst 13. As a result, as shown in FIG. 6B, the hydrocarbon concentration around the active $NO_x^*$ becomes higher. In this regard, after the active $NO_x^*$ is produced, if the state of a high oxygen concentration around the active $NO_x^*$ continues for a predetermined time or more, the active $NO_x^*$ is oxidized and the majority of the active $NO_x^*$ is absorbed in the basic layer 53 in the form of nitrate ions $NO_3^-$. However, if the hydrocarbon concentration around the active $NO_x^*$ is made higher before this predetermined time passes, as shown in FIG. 6B, the active $NO_x^*$ reacts on the platinum 51 with the radical hydrocarbons HC whereby a reducing intermediate is produced. This reducing intermediate is adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrile compound R—CN can only survive for an instant in this state, so immediately becomes an isocyanate compound R—NCO. This isocyanate compound R—NCO, when hydrolyzed, becomes an amine compound R—$NH_2$. However, in this case, what is hydrolyzed is considered to be part of the isocyanate compound R—NCO. Therefore, as shown in FIG. 6B, the majority of the reducing intermediate which is held or adsorbed on the surface of the basic layer 53 is believed to be the isocyanate compound R—NCO and amine compound R—$NH_2$.

On the other hand, as shown in FIG. 6B, if the produced reducing intermediate is surrounded by the hydrocarbons HC, the reducing intermediate is blocked by the hydrocarbons HC and the reaction will not proceed any further. In this case, if the concentration of hydrocarbons flowing into the exhaust purification catalyst 13 is lowered and thereby the oxygen concentration becomes higher, the hydrocarbons around the reducing intermediate will be oxidized. As a result, as shown in FIG. 6A, the reducing intermediate and the active $NO_x^*$ will react. At this time, the active $NO_x^*$ reacts with the reducing intermediate R—NCO or R—$NH_2$ to form $N_2$, $CO_2$, and $H_2O$ and consequently the $NO_x$ is removed.

In this way, in the exhaust purification catalyst 13, by making the concentration of hydrocarbons flowing into the exhaust purification catalyst 13 higher, a reducing intermediate is produced. By making the concentration of hydrocarbons flowing into the exhaust purification catalyst 13 lower and raising the oxygen concentration, the active $NO_x^*$ reacts with the reducing intermediate and the $NO_x$ is removed. That is, in order for the exhaust purification catalyst 13 to remove the $NO_x$, the concentration of hydrocarbons flowing into the exhaust purification catalyst 13 has to be periodically changed.

Of course, in this case, it is necessary to raise the concentration of hydrocarbons to a concentration sufficiently high for producing the reducing intermediate and it is necessary to lower the concentration of hydrocarbons to a concentration sufficiently low for making the produced reducing intermediate react with the active $NO_x^*$. That is, it is necessary to make the concentration of hydrocarbons flowing into the exhaust purification catalyst 13 vibrate by within a predetermined range of amplitude. Note that, in this case, it is necessary to hold a sufficient amount of reducing intermediate R—NCO or R—$NH_2$ on the basic layer 53, that is, the basic exhaust gas flow surface part 54, until the produced reducing intermediate reacts with the active $NO_x^*$. For this reason, the basic exhaust gas flow surface part 54 is provided.

On the other hand, if lengthening the feed period of the hydrocarbons, the time in which the oxygen concentration becomes higher becomes longer in the period after the hydrocarbons are fed until the hydrocarbons are next fed. Therefore, the majority of the active $NO_x^*$ is absorbed in the basic layer 53 in the form of nitrates without producing a reducing intermediate. To avoid this, it is necessary to make the concentration of hydrocarbons flowing into the exhaust purification catalyst 13 vibrate by within a predetermined range of period.

Therefore, in an embodiment of the present invention, to make the $NO_x$ contained in the exhaust gas and the reformed hydrocarbons react and produce the reducing intermediate R—NCO or R—$NH_2$ containing nitrogen and hydrocarbons, precious metal catalysts 51 and 52 are carried on the exhaust gas flow surface of the exhaust purification catalyst 13. To hold the produced reducing intermediate R—NCO or R—$NH_2$ inside the exhaust purification catalyst 13, a basic exhaust gas flow surface part 54 is formed around the precious metal catalysts 51 and 52. $NO_x$ is reduced by the reducing action of the reducing intermediate R—NCO or R—$NH_2$ held on the basic exhaust gas flow surface part 54, and the vibration period of the hydrocarbon concentration is made the vibration period required for continuation of the production of the reducing intermediate R—NCO or R—$NH_2$. Incidentally, in the example shown in FIG. 4, the injection interval is made 3 seconds.

Figure 7A:
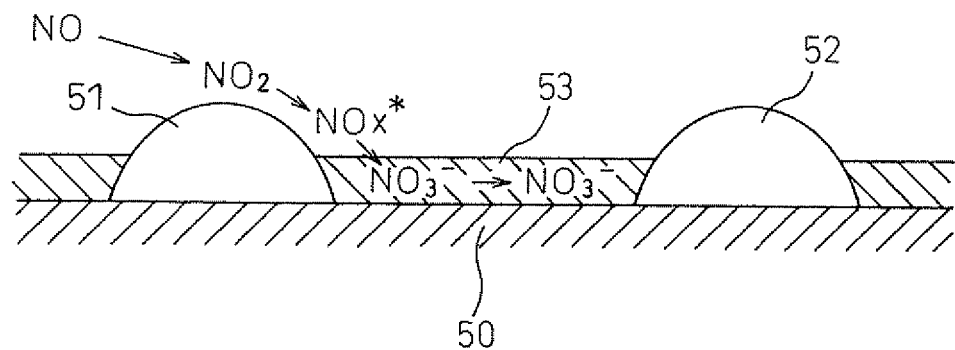
FIGS. 7A and 7B are views for explaining an oxidation reduction reaction in an exhaust purification catalyst.

If the vibration period of the hydrocarbon concentration, that is, the feed period of the hydrocarbons HC, is made longer than the above predetermined range of period, the reducing intermediate R—NCO or R—$NH_2$ disappears from the surface of the basic layer 53. At this time, the active $NO_x^*$ which was produced on the platinum Pt 51, as shown in FIG. 7A, diffuses in the basic layer 53 in the form of nitrate ions $NO_3^-$ and becomes nitrates. That is, at this time, the $NO_x$ in the exhaust gas is absorbed in the form of nitrates inside of the basic layer 53.

Figure 7B:
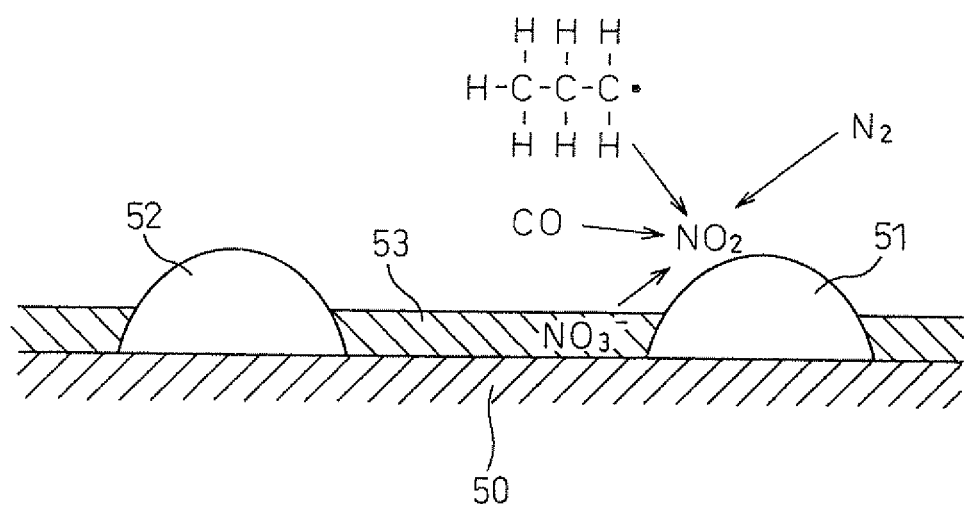

On the other hand, FIG. 7B shows the case where the air-fuel ratio of the exhaust gas which flows into the exhaust purification catalyst 13 is made the stoichiometric air-fuel ratio or rich when the $NO_x$ is absorbed in the form of nitrates inside of the basic layer 53. In this case, the oxygen concentration in the exhaust gas falls, so the reaction proceeds in the opposite direction ($NO_3^- \rightarrow NO_2$), and consequently the nitrates absorbed in the basic layer 53 become nitrate ions $NO_3^-$ one by one and, as shown in FIG. 7B, are released from the basic layer 53 in the form of $NO_2$. Next, the released $NO_2$ is reduced by the hydrocarbons HC and CO contained in the exhaust gas.

Figure 8:
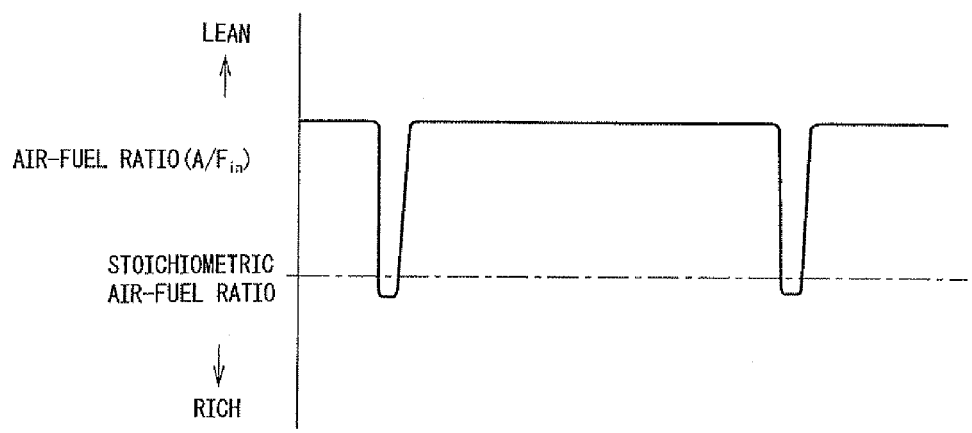
FIG. 8 is a view showing a change of an air-fuel ratio of exhaust gas flowing into an exhaust purification catalyst.

FIG. 8 shows the case of making the air-fuel ratio (A/F) in of the exhaust gas which flows into the exhaust purification catalyst 13 temporarily rich slightly before the $NO_x$ absorption ability of the basic layer 53 becomes saturated. Note that, in the example shown in FIG. 8, the time interval of this rich control is 1 minute or more. In this case, the $NO_x$ which was absorbed in the basic layer 53 when the air-fuel ratio (A/F) in of the exhaust gas was lean is released all at once from the basic layer 53 and reduced when the air-fuel ratio (A/F) in of the exhaust gas is made temporarily rich. Therefore, in this case, the basic layer 53 plays the role of an absorbent for temporarily absorbing $NO_x$.

Note that, at this time, sometimes the basic layer 53 temporarily adsorbs the $NO_x$. Therefore, if using term of storage as a term including both absorption and adsorption, at this time, the basic layer 53 performs the role of an $NO_x$ storage agent for temporarily storing the $NO_x$. That is, in this case, if referring to the ratio of the air and fuel (hydrocarbons) which are supplied into the engine intake passage, combustion chambers 2, and exhaust passage upstream of the exhaust purification catalyst 13 as the air-fuel ratio of the exhaust gas, the exhaust purification catalyst 13 functions as an $NO_x$ storage catalyst which stores the $NO_x$ when the air-fuel ratio of the exhaust gas is lean and releases the stored $NO_x$ when the oxygen concentration in the exhaust gas falls.

Figure 9:
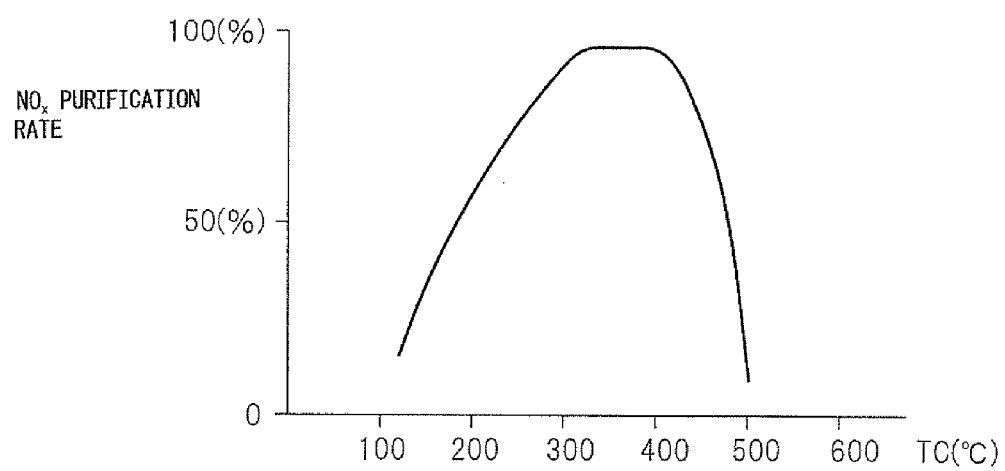
FIG. 9 is a view of an $NO_x$ purification rate.

FIG. 9 shows the $NO_x$ purification rate when making the exhaust purification catalyst 13 function as an $NO_x$ storage catalyst in this way. Note that, the abscissa of the FIG. 9 shows the catalyst temperature TC of the exhaust purification catalyst 13. When making the exhaust purification catalyst 13 function as an $NO_x$ storage catalyst, as shown in FIG. 9, when the catalyst temperature TC is 300° C. to 400° C., an extremely high $NO_x$ purification rate is obtained, but when the catalyst temperature TC becomes a 400° C. or higher high temperature, the $NO_x$ purification rate falls.

In this way, when the catalyst temperature TC becomes 400° C. or more, the $NO_x$ purification rate falls because if the catalyst temperature TC becomes 400° C. or more, the nitrates break down by heat and are released in the form of $NO_2$ from the exhaust purification catalyst 13. That is, so long as storing $NO_x$ in the form of nitrates, when the catalyst temperature TC is high, it is difficult to obtain a high $NO_x$ purification rate. However, in the new $NO_x$ purification method shown from FIG. 4 to FIGS. 6A and 6B, as will be understood from FIGS. 6A and 6B, nitrates are not formed or even if formed are extremely fine in amount, consequently, as shown in FIG. 5, even when the catalyst temperature TC is high, a high $NO_x$ purification rate is obtained.

Therefore, in the present invention, an exhaust purification catalyst 13 for reacting $NO_x$ contained in exhaust gas and reformed hydrocarbons is arranged inside of an engine exhaust passage, precious metal catalysts 51 and 52 are carried on the exhaust gas flow surface of the exhaust purification catalyst 13, a basic exhaust gas flow surface part 54 is formed around the precious metal catalysts 51 and 52, the exhaust purification catalyst 13 has the property of reducing the $NO_x$ which is contained in exhaust gas if the concentration of hydrocarbons flowing into the exhaust purification catalyst 13 is made to vibrate within a predetermined range of amplitude and within a predetermined range of period and has the property of being increased in storage amount of $NO_x$ which is contained in exhaust gas if the vibration period of the hydrocarbon concentration is made longer than this predetermined range, and, at the time of engine operation, the concentration of hydrocarbons flowing into the exhaust purification catalyst 13 is made to vibrate within the predetermined range of amplitude and within the predetermined range of period to thereby reduce the $NO_x$ which is contained in the exhaust gas in the exhaust purification catalyst 13.

That is, the $NO_x$ purification method which is shown from FIG. 4 to FIGS. 6A and 6B can be said to be a new $NO_x$ purification method designed to remove $NO_x$ without forming almost any nitrates in the case of using an exhaust purification catalyst which carries a precious metal catalyst and forms a basic layer which can absorb $NO_x$. In actuality, when using this new $NO_x$ purification method, the nitrates which are detected from the basic layer 53 become much smaller in amount compared with the case where making the exhaust purification catalyst 13 function as an $NO_x$ storage catalyst. Note that, this new $NO_x$ purification method will be referred to below as the first $NO_x$ purification method.

Next, referring to FIG. 10 to FIG. 15, this first $NO_x$ purification method will be explained in a bit more detail.

Figure 10:
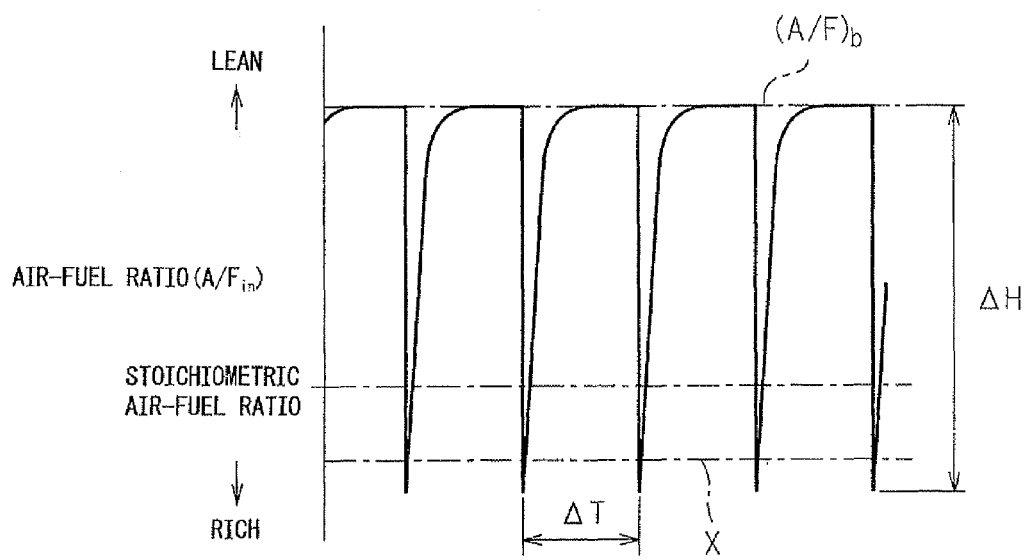
FIG. 10 is a time chart showing a change of an air-fuel ratio of exhaust gas flowing into an exhaust purification catalyst.

FIG. 10 shows enlarged the change in the air-fuel ratio (A/F) in shown in FIG. 4. Note that, as explained above, the change in the air-fuel ratio (A/F) in of the exhaust gas flowing into this exhaust purification catalyst 13 simultaneously shows the change in concentration of the hydrocarbons which flow into the exhaust purification catalyst 13. Note that, in FIG. 10, ΔH shows the amplitude of the change in concentration of hydrocarbons HC which flow into the exhaust purification catalyst 13, while ΔT shows the vibration period of the concentration of the hydrocarbons which flow into the exhaust purification catalyst 13.

Furthermore, in FIG. 10, (A/F) b shows the base air-fuel ratio which shows the air-fuel ratio of the combustion gas for generating the engine output. In other words, this base air-fuel ratio (A/F) b shows the air-fuel ratio of the exhaust gas which flows into the exhaust purification catalyst 13 when stopping the feed of hydrocarbons. On the other hand, in FIG. 10, X shows the upper limit of the air-fuel ratio (A/F) in used for producing the reducing intermediate without the produced active $NO_x^*$ being stored in the form of nitrates inside the basic layer 53 much at all. To make the active $NO_x^*$ and the modified hydrocarbons react to produce a reducing intermediate, the air-fuel ratio (A/F) in has to be made lower than this upper limit X of the air-fuel ratio.

In other words, in FIG. 10, X shows the lower limit of the concentration of hydrocarbons required for making the active $NO_x^*$ and reformed hydrocarbon react to produce a reducing intermediate. To produce the reducing intermediate, the concentration of hydrocarbons has to be made higher than this lower limit X. In this case, whether the reducing intermediate is produced is determined by the ratio of the oxygen concentration and hydrocarbon concentration around the active $NO_x^*$, that is, the air-fuel ratio (A/F) in. The upper limit X of the air-fuel ratio required for producing the reducing intermediate will below be called the demanded minimum air-fuel ratio.

In the example shown in FIG. 10, the demanded minimum air-fuel ratio X is rich, therefore, in this case, to form the reducing intermediate, the air-fuel ratio (A/F) in is instantaneously made the demanded minimum air-fuel ratio X or less, that is, rich. As opposed to this, in the example shown in FIG. 11, the demanded minimum air-fuel ratio X is lean. In this case, the air-fuel ratio (A/F) in is maintained lean while periodically reducing the air-fuel ratio (A/F) in so as to form the reducing intermediate.

In this case, whether the demanded minimum air-fuel ratio X becomes rich or becomes lean depends on the oxidizing strength of the exhaust purification catalyst 13. In this case, the exhaust purification catalyst 13, for example, becomes stronger in oxidizing strength if increasing the carried amount of the precious metal 51 and becomes stronger in oxidizing strength if strengthening the acidity. Therefore, the oxidizing strength of the exhaust purification catalyst 13 changes due to the carried amount of the precious metal 51 or the strength of the acidity.

Figure 11:
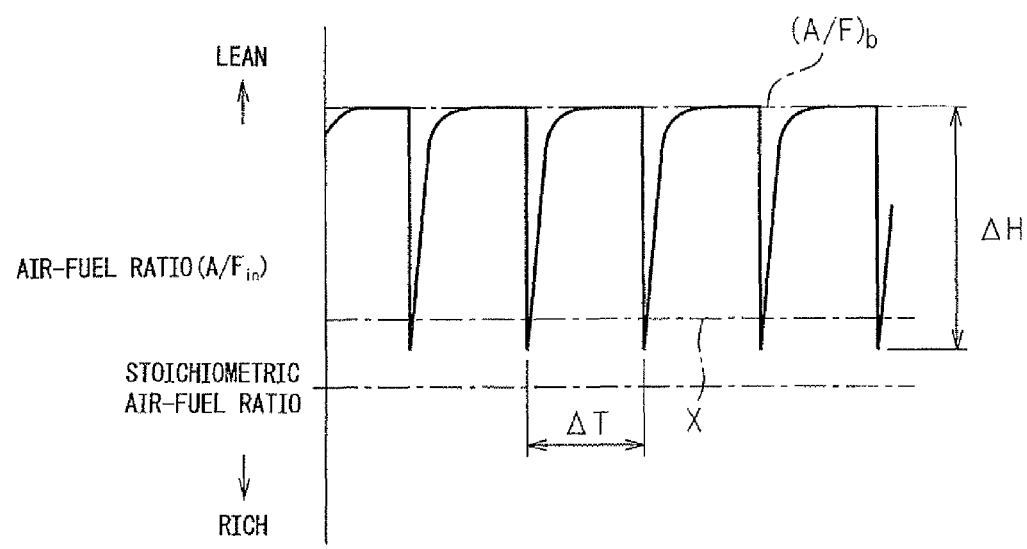
FIG. 11 is a time chart showing a change of an air-fuel ratio of exhaust gas flowing into an exhaust purification catalyst.

Now, when using an exhaust purification catalyst 13 with a strong oxidizing strength, if the air-fuel ratio (A/F) in is periodically lowered while maintaining the air-fuel ratio (A/F) in lean as shown in FIG. 11, the hydrocarbons are completely oxidized when the air-fuel ratio (A/F) in is lowered. As a result, the reducing intermediate cannot be produced. As opposed to this, when using an exhaust purification catalyst 13 with a strong oxidizing strength, if the air-fuel ratio (A/F) in is periodically made rich as shown in FIG 10, the hydrocarbons are partially oxidized, when the air-fuel ratio (A/F) in is made rich. As a result, the reducing intermediate is produced. Therefore, when using an exhaust purification catalyst 13 with a strong oxidizing strength, the demanded minimum air-fuel ratio X has to be made rich as shown in FIG. 10.

On the other hand, when using an exhaust purification catalyst 13 with a weak oxidizing strength, if the air-fuel ratio (A/F) in is periodically lowered while maintaining the air-fuel ratio (A/F) in lean as shown in FIG. 11, the hydrocarbons will be partially oxidized and consequently the reducing intermediate is produced. As opposed to this, when using an exhaust purification catalyst 13 with a weak oxidizing strength, if the air-fuel ratio (A/F) in is periodically made rich as shown in FIG. 10, a large amount of hydrocarbons are exhausted from the exhaust purification catalyst 13. Therefore, when using an exhaust purification catalyst 13 with a weak oxidizing strength, the demanded minimum air-fuel ratio X has to be made lean as shown in FIG. 11.

Figure 12:
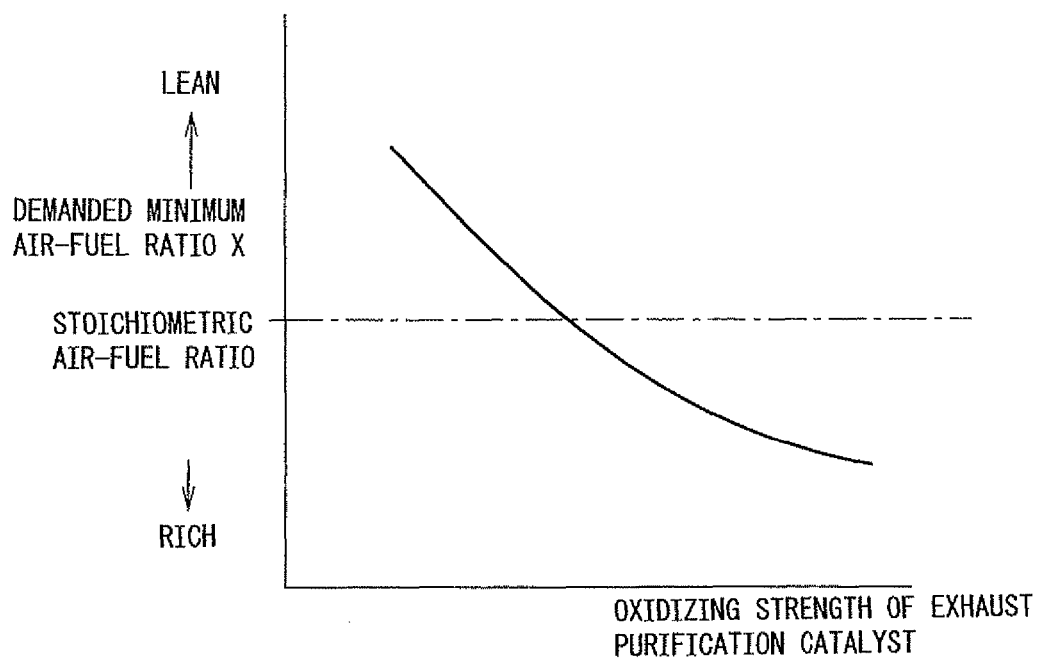
FIG. 12 is a view showing a relationship between an oxidizing strength of an exhaust purification catalyst and a demanded minimum air-fuel ratio X.

That is, it is learned that the demanded minimum air-fuel ratio X, as shown in FIG. 12, has to be reduced the stronger the oxidizing strength of the exhaust purification catalyst 13. In this way the demanded minimum air-fuel ratio X becomes lean or rich due to the oxidizing strength of the exhaust purification catalyst 13. Below, taking as an example the case where the demanded minimum air-fuel ratio X is rich, the amplitude of the change in concentration of hydrocarbons flowing into the exhaust purification catalyst 13 and the vibration period of the concentration of hydrocarbons flowing into the exhaust purification catalyst 13 will be explained.

Now, if the base air-fuel ratio (A/F) b becomes larger, that is, if the oxygen concentration in the exhaust gas before the hydrocarbons are fed becomes higher, the feed amount of hydrocarbons required for making the air-fuel ratio (A/F) in the demanded minimum air-fuel ratio X or less increases and along with this the excess amount of hydrocarbons which did not contribute to the production of the reducing intermediate also increases. In this case, to remove the $NO_x$ well, as explained above, it is necessary to make the excess hydrocarbons oxidize. Therefore, to remove the $NO_x$ well, the larger the amount of excess hydrocarbons, the larger the amount of oxygen which is required.

In this case, if raising the oxygen concentration in the exhaust gas, the amount of oxygen can be increased. Therefore, to remove the $NO_x$ well, when the oxygen concentration in the exhaust gas before the hydrocarbons are fed is high, it is necessary to raise the oxygen concentration in the exhaust gas after feeding the hydrocarbons. That is, the higher the oxygen concentration in the exhaust gas before the hydrocarbons are fed, the larger the amplitude of the hydrocarbon concentration has to be made.

Figure 13:
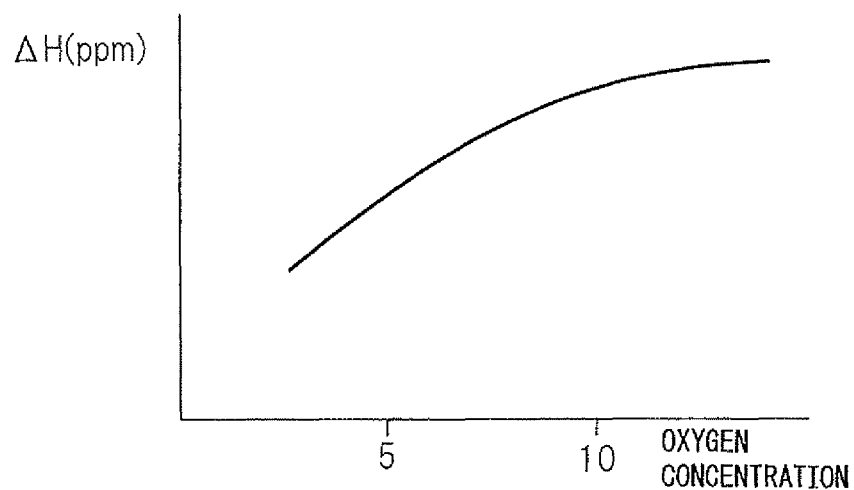
FIG. 13 is a view showing a relationship between an oxygen concentration in exhaust gas and an amplitude $\Delta H$ of a hydrocarbon concentration giving the same $NO_x$ purification rate.

FIG. 13 shows the relationship between the oxygen concentration in the exhaust gas before the hydrocarbons are fed and the amplitude ΔH of the hydrocarbon concentration when the same $NO_x$ purification rate is obtained. From FIG. 13, it is learned that, to obtain the same $NO_x$ purification rate the higher the oxygen concentration in the exhaust gas before the hydrocarbons are fed, the greater the amplitude ΔH of the hydrocarbon concentration has to be made. That is, to obtain the same $NO_x$ purification rate, the higher the base air-fuel ratio (A/F) b, the greater the amplitude ΔT of the hydrocarbon concentration has to be made. In other words, to remove the $NO_x$ well, the lower the base air-fuel ratio (A/F) b, the more the amplitude ΔH of the hydrocarbon concentration can be reduced.

Figure 14:
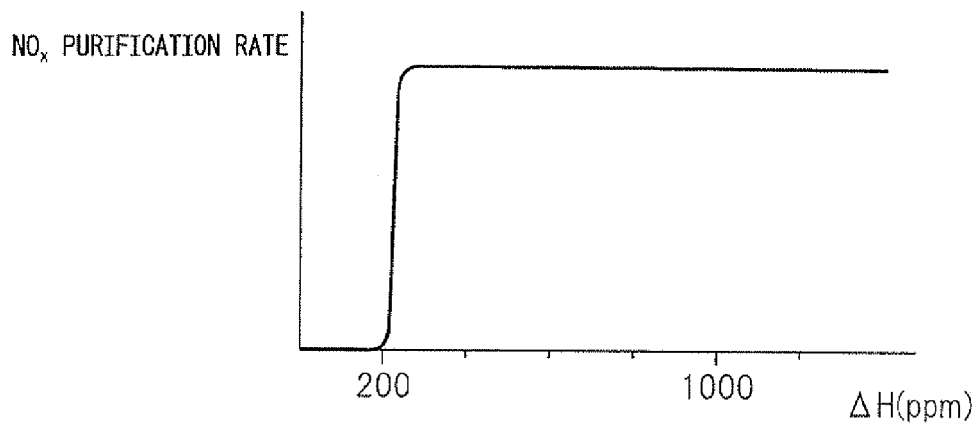
FIG. 14 is a view showing a relationship between an amplitude $\Delta H$ of a hydrocarbon concentration and an $NO_x$ purification rate.

In this regard, the base air-fuel ratio (A/F) b becomes the lowest at the time of an acceleration operation. At this time, if the amplitude ΔH of the hydrocarbon concentration is about 200 ppm, it is possible to remove the $NO_x$ well. The base air-fuel ratio (A/F) b is normally larger than the time of acceleration operation. Therefore, as shown in FIG. 14, if the amplitude ΔH of the hydrocarbon concentration is 200 ppm or more, an excellent $NO_x$ purification rate can be obtained.

On the other hand, it is learned that when the base air-fuel ratio (A/F) b is the highest, if making the amplitude ΔH of the hydrocarbon concentration 10000 ppm or so, an excellent $NO_x$ purification rate is obtained. Therefore, in the present invention, the predetermined range of the amplitude of the hydrocarbon concentration is made 200 ppm to 10000 ppm.

Figure 15:
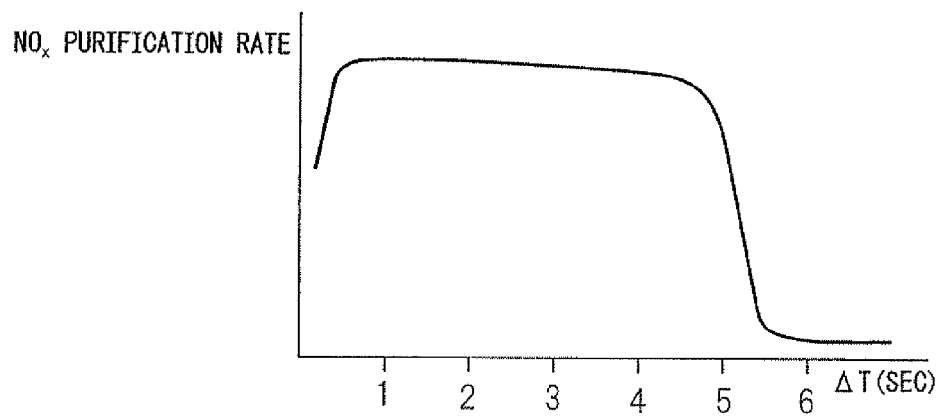
FIG. 15 is a view showing a relationship of a vibration period $\Delta T$ of a hydrocarbon concentration and an $NO_x$ purification rate.

Further, if the vibration period ΔT of the hydrocarbon concentration becomes longer, the oxygen concentration around the active $NO_x^*$ becomes higher in the time after the hydrocarbons are fed to when the hydrocarbons are next fed. In this case, if the vibration period ΔT of the hydrocarbon concentration becomes longer than about 5 seconds, the majority of the active $NO_x^*$ starts to be absorbed in the form of nitrates inside the basic layer 53. Therefore, as shown in FIG. 15, if the vibration period ΔT of the hydrocarbon concentration becomes longer than about 5 seconds, the $NO_x$ purification rate falls. Therefore, the vibration period ΔT of the hydrocarbon concentration has to be made 5 seconds or less.

On the other hand, if the vibration period ΔT of the hydrocarbon concentration becomes about 0.3 second or less, the fed hydrocarbons start to build up on the exhaust gas flow surface of the exhaust purification catalyst 13, therefore, as shown in FIG. 15, if the vibration period ΔT of the hydrocarbon concentration becomes about 0.3 second or less, the $NO_x$ purification rate falls. Therefore, in the present invention, the vibration period of the hydrocarbon concentration is made from 0.3 second to 5 seconds.

Figure 16:
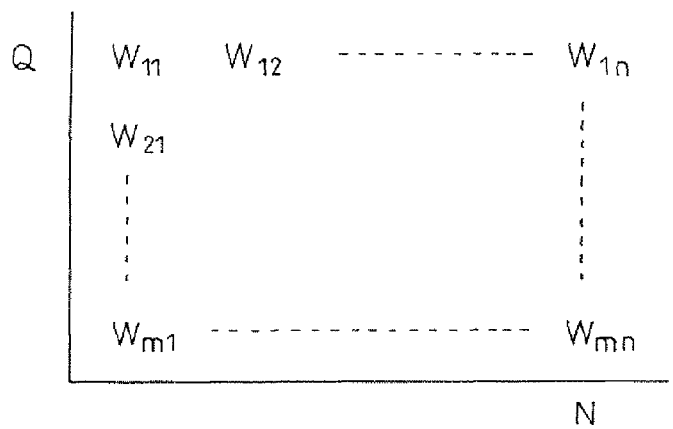
FIG. 16 is a view showing a map of the hydrocarbon feed amount W.

Now, in the present invention, by changing the hydrocarbon feed amount and injection timing from the hydrocarbon feed valve 15, the amplitude ΔH and vibration period ΔT of the hydrocarbons concentration is controlled so as to become the optimum values in accordance with the engine operating state. In this case, in this embodiment of the present invention, the hydrocarbon feed amount W able to give the optimum amplitude ΔH of the hydrocarbon concentration is stored as a function of the injection amount Q from the fuel injector 3 and engine speed N in the form of a map such as shown in FIG. 16 in advance in the ROM 32. Further, the optimum vibration period ΔT of the hydrocarbon concentration, that is, the injection period ΔT of the hydrocarbons is similarly stored as a function of the injection amount Q and engine speed N in the form of a map in advance in the ROM 32.

Next, referring to FIG. 17 to FIG. 20, an $NO_x$ purification method in the case when making the exhaust purification catalyst 13 function as an $NO_x$ storage catalyst will be explained in detail. The $NO_x$ purification method in the case when making the exhaust purification catalyst 13 function as an $NO_x$ storage catalyst in this way will be referred to below as the second $NO_x$ purification method.

Figure 17:
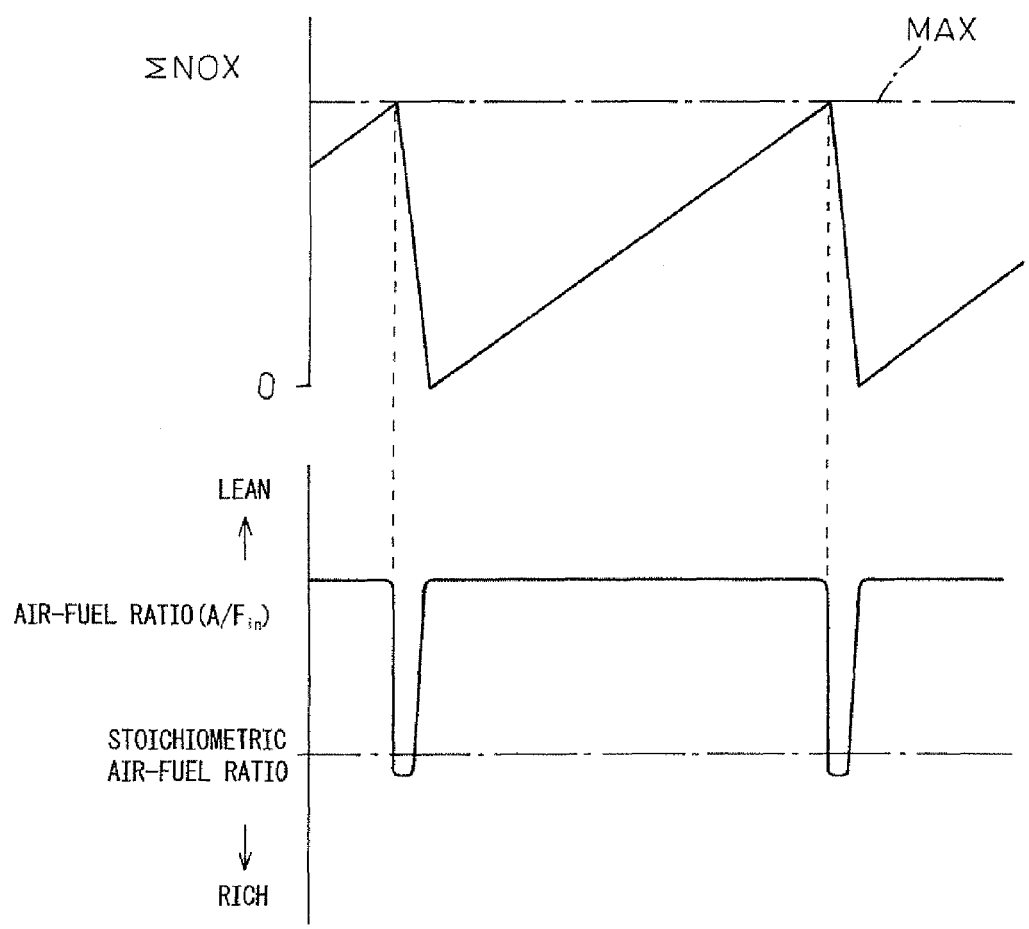
FIG. 17 is a view showing a change in the air-fuel ratio of the exhaust gas flowing to the exhaust purification catalyst etc.

In this second $NO_x$ purification method, as shown in FIG. 17, when the stored $NO_x$ amount ΣNOX of $NO_x$ which is stored in the basic layer 53 exceeds a predetermined allowable amount MAX, the air-fuel ratio (A/F) in of the exhaust gas flowing into the exhaust purification catalyst 13 is temporarily made rich. If the air-fuel ratio (A/F) in of the exhaust gas is made rich, the $NO_x$ which was stored in the basic layer 53 when the air-fuel ratio (A/F) in of the exhaust gas was lean is released from the basic layer 53 all at once and reduced. Due to this, the $NO_x$ is removed.

Figure 18:
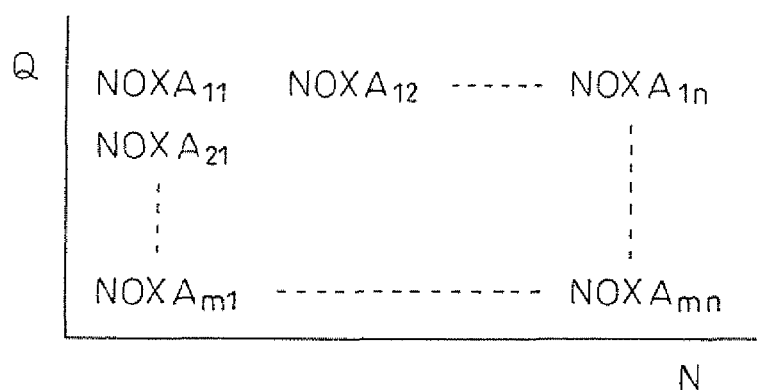
FIG. 18 is a view showing a map of an exhausted $NO_x$ amount NOXA.

The stored $NO_x$ amount ΣNOX is, for example, calculated from the amount of $NO_x$ which is exhausted from the engine. In this embodiment according to the present invention, the exhausted $NO_x$ amount NOXA of $NO_x$ which is exhausted from the engine per unit time is stored as a function of the injection amount Q and engine speed N in the form of a map such as shown in FIG. 18 in advance in the ROM 32. The stored $NO_x$ amount ΣNOX is calculated from exhausted $NO_x$ amount NOXA. In this case, as explained before, the period in which the air-fuel ratio (A/F) in of the exhaust gas is made rich is usually 1 minute or more.

Figure 19:
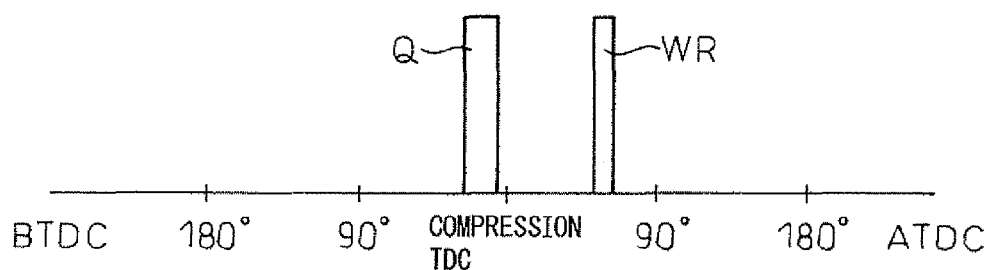
FIG. 19 is a view showing a fuel injection timing.
Figure 20:
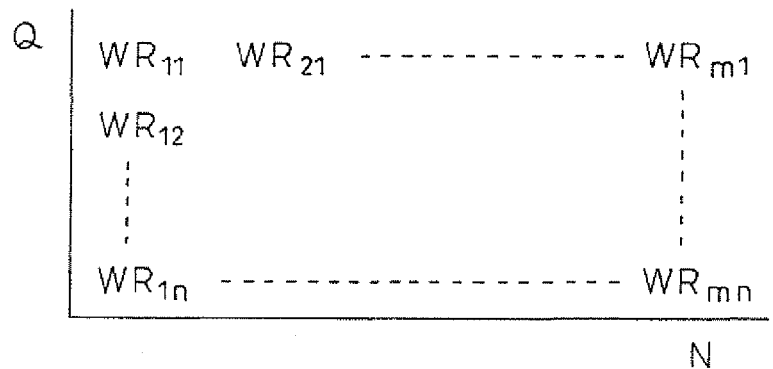
FIG. 20 is a view showing a map of a hydrocarbon feed amount WR.

In this second $NO_x$ purification method, as shown in FIG. 19, the fuel injector 3 injects additional fuel WR into the combustion chamber 2 in addition to the combustion-use fuel Q so that the air-fuel ratio (A/F) in of the exhaust gas flowing into the exhaust purification catalyst 13 is made rich. Note that, in FIG. 19, the abscissa indicates the crank angle. This additional fuel WR is injected at a timing at which it will burn, but will not appear as engine output, that is, slightly before ATDC90° after compression top dead center. This fuel amount WR is stored as a function of the injection amount Q and engine speed N in the form of a map such as shown in FIG. 20 in advance in the ROM 32. Of course, in this case, it is also possible to make the amount of feed of hydrocarbons from the hydrocarbon feed valve 15 increase so as to make the air-fuel ratio (A/F) in of the exhaust gas rich.

In this regard, to use the first $NO_x$ purification method to remove $NO_x$, even when the $NO_x$ concentration in the exhaust gas is low, at least a certain amount of hydrocarbons has to be fed in a short period. Therefore, when the $NO_x$ concentration of the exhaust gas is low, the $NO_x$ purification efficiency becomes poor. As opposed to this, in the second $NO_x$ purification method, when the $NO_x$ concentration in the exhaust gas is low, the time until the stored $NO_x$ amount ΣNOX reaches the allowable value MAX becomes longer, so the period for making the air-fuel ratio (A/F) in of the exhaust gas rich just becomes longer, and accordingly, $NO_x$ purification efficiency does not particularly become worse. Therefore, when the $NO_x$ concentration in the exhaust gas is low, use of the second $NO_x$ purification method rather than the first $NO_x$ purification method can be said to be preferable. That is, which of the first $NO_x$ purification method and second $NO_x$ purification method should be used changes in the engine operating state.

Now, as explained before, when the second $NO_x$ purification method is used, $NO_x$ is stored in the form of nitrate ions $NO_3^-$ inside the basic layer 53. Further, even when the first $NO_x$ purification method is used, while actually small in amount, $NO_x$, as shown in FIG. 6A, is stored in the form of nitrate ions $NO_3^-$ inside the basic layer 53. Therefore, as explained before, when the first $NO_x$ purification method is being used, nitrates are detected, though small in amount, from the basic layer 53. In this regard, in this way, if the $NO_x$ is stored inside the basic layer 53, the amount of production of the reducing intermediate is reduced and the $NO_x$ purification rate ends up falling.

If explaining this with reference to the case where the basic layer 53 is formed from the alkaline earth metal barium Ba as an example, first the active $NO_x^*$ which is produced when the $NO_x$ purification method is being performed is attracted by the barium Ba and held on the basic layer 53 then becomes a reducing intermediate. However, if the active $NO_x^*$ is pulled into the basic layer 53 and becomes the nitrate $Ba(NO_3)_2$, the force of the barium attracting the active $NO_x^*$ ends up disappearing, that is, the base sites end up disappearing. Therefore, if the amount of the active $NO_x^*$ which is stored inside the basic layer 53 increases, the amount of active $NO_x^*$ itself is reduced, so not only is the amount of production of the reducing intermediate decreased, but also the force holding the active $NO_x^*$ on the basic layer 53 becomes weaker, so the amount of production of the reducing intermediate is decreased.

If the amount of production of the reducing intermediate is decreased in this way, the $NO_x$ purification rate falls. That is, if the amount of the active $NO_x^*$ which is stored inside the basic layer 53 is increased, the $NO_x$ purification rate falls. Note that, the $NO_x$ which is stored in the basic layer 53 is desorbed and forms the reducing intermediate if the temperature of the exhaust purification catalyst 13 becomes higher. That is, when the temperature of the exhaust purification catalyst 13 is high, a high $NO_x$ purification rate is secured without the $NO_x$ storage action being performed. The $NO_x$ storage action is performed and the $NO_x$ purification rate falls when the temperature of the exhaust purification catalyst 13 is low.

Figure 21:
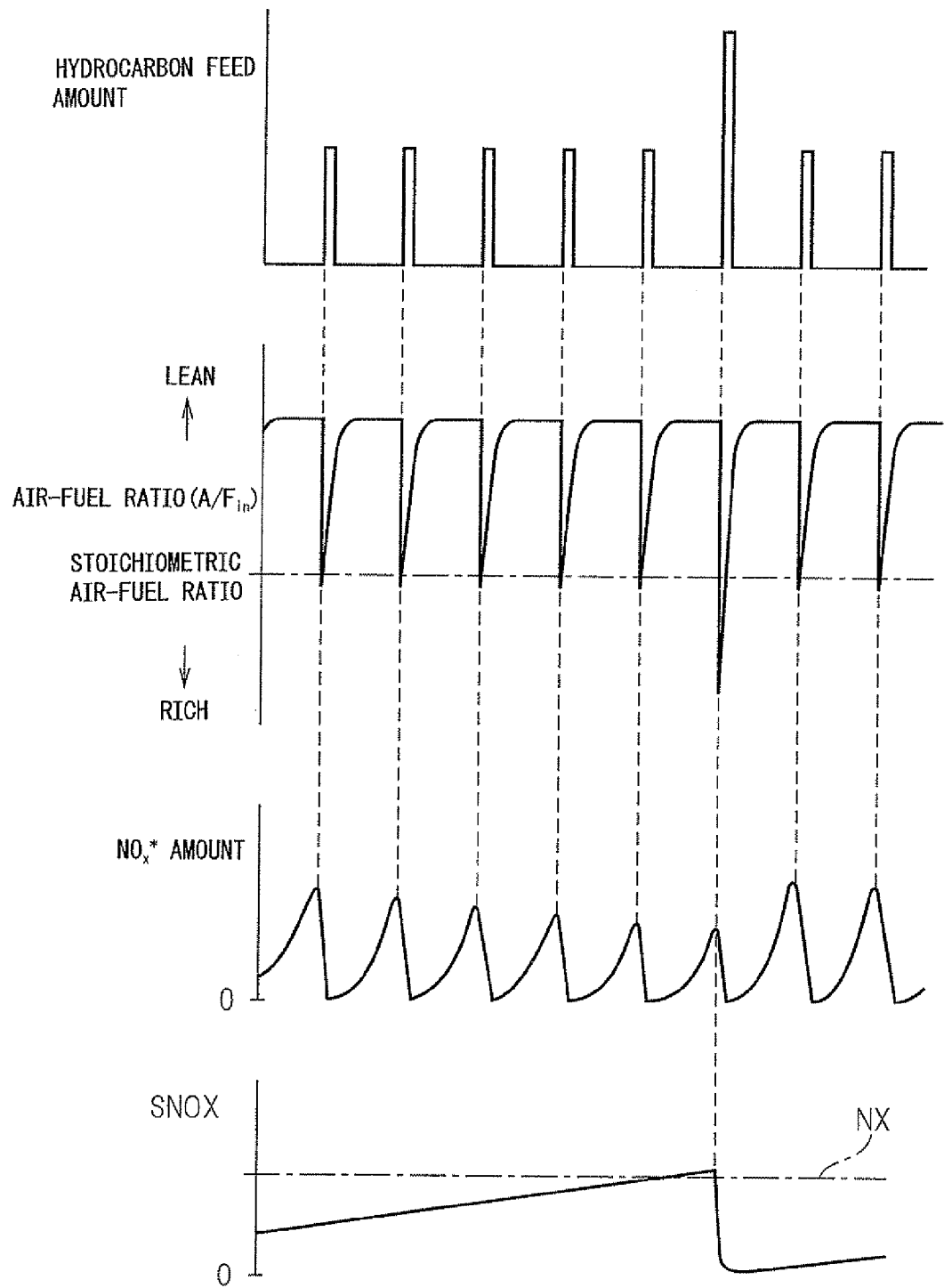
FIG. 21 is a time chart showing changes in an amount active $NO_x^*$, a stored $NO_x$ amount SNOX, etc.

FIG. 21 shows the changes in the amount of feed of hydrocarbons from the hydrocarbon feed valve 15, the air-fuel ratio (A/F) in of the exhaust gas flowing into the exhaust purification catalyst 13, the amount of active $NO_x^*$ which is held on the basic layer 53, and the stored $NO_x$ amount SNOX which is stored inside the basic layer 53 when the $NO_x$ purification action by the first $NO_x$ purification method is being performed in the state where the temperature of the exhaust purification catalyst 13 is relatively low. As will be understood from FIG. 21, the active $NO_x^*$ which is held on the basic layer 53 is used for producing a reducing intermediate when hydrocarbons are fed and the air-fuel ratio (A/F) in of the exhaust gas falls. Therefore, at this time, the active $NO_x^*$ temporarily disappears from the basic layer 53. Next, if the air-fuel ratio (A/F) in of the exhaust gas becomes higher, the amount of active $NO_x^*$ gradually increases.

On the other hand, as shown in FIG. 21, the stored $NO_x$ amount SNOX increases along with the elapse of time. If the stored $NO_x$ amount SNOX increases, as shown in FIG. 21, the amount of active $NO_x^*$ decreases, therefore the amount of production of the reducing intermediate decreases. Therefore, if the stored $NO_x$ amount SNOX increases, the $NO_x$ purification rate falls. In this case, the allowable drop in the $NO_x$ purification rate is predetermined, and if the $NO_x$ purification rate falls to this allowable drop, the $NO_x$ purification rate has to be restored.

In this case, if making the $NO_x$ which is stored in the basic layer 53 desorb from the basic layer 53, the $NO_x$ purification rate is restored. On the other hand, when the $NO_x$ purification action is being performed by the first $NO_x$ purification method, if the concentration of hydrocarbons flowing into the exhaust purification catalyst 13 is made to temporarily increase, $NO_x$ is desorbed from the basic layer 53. The desorbed $NO_x$ becomes a reducing intermediate. Therefore, in the present invention, when the $NO_x$ purification rate falls to the allowable drop, the concentration of hydrocarbons flowing into the exhaust purification catalyst 13 is made to temporarily increase whereby the $NO_x$ purification rate is restored.

In this case, in the present invention, the amount NX of the stored $NO_x$ amount SNOX which causes such an allowable amount of drop in the $NO_x$ purification rate is predetermined. When the $NO_x$ purification action is being performed by the first $NO_x$ purification method, if this predetermined amount NX or more of $NO_x$ is stored in the exhaust purification catalyst 13 or can be stored in it, the concentration of hydrocarbons flowing into the exhaust purification catalyst 13 is temporarily increased for making the $NO_x$ which was stored at the exhaust purification catalyst 13 desorb from it.

Note that, in this way, the air-fuel ratio (A/F) in of the exhaust gas when the concentration of hydrocarbons is temporarily increased is made rich and smaller than the air-fuel ratio (A/F) in of the exhaust gas when the $NO_x$ purification action is being performed by the first $NO_x$ purification method. That is, in other words, when the $NO_x$ purification action is being performed by the first $NO_x$ purification method, the concentration of hydrocarbons is made to vibrate by within the predetermined range of amplitude ΔH. The air-fuel ratio (A/F) in of the exhaust gas flowing into the exhaust purification catalyst 13 when the concentration of hydrocarbons is temporarily increased is made rich and smaller than the air-fuel ratio (A/F) in of the exhaust gas flowing into the exhaust purification catalyst 13 when the concentration of hydrocarbons is made to vibrate by within the predetermined range of amplitude ΔH.

Next, explaining the present invention in a bit more detail, in the first embodiment of the present invention, when the $NO_x$ purification action is being performed by the first $NO_x$ purification method, the stored $NO_x$ amount SNOX which is stored in the exhaust purification catalyst 13 is calculated. When the calculated stored $NO_x$ amount SNOX exceeds the predetermined amount NX, as shown in FIG. 21, the concentration of hydrocarbons flowing into the exhaust purification catalyst 13 is temporarily increased.

Next, referring to FIG. 22, the method of calculation of the stored $NO_x$ amount SNOX will be explained.

Figure 22:
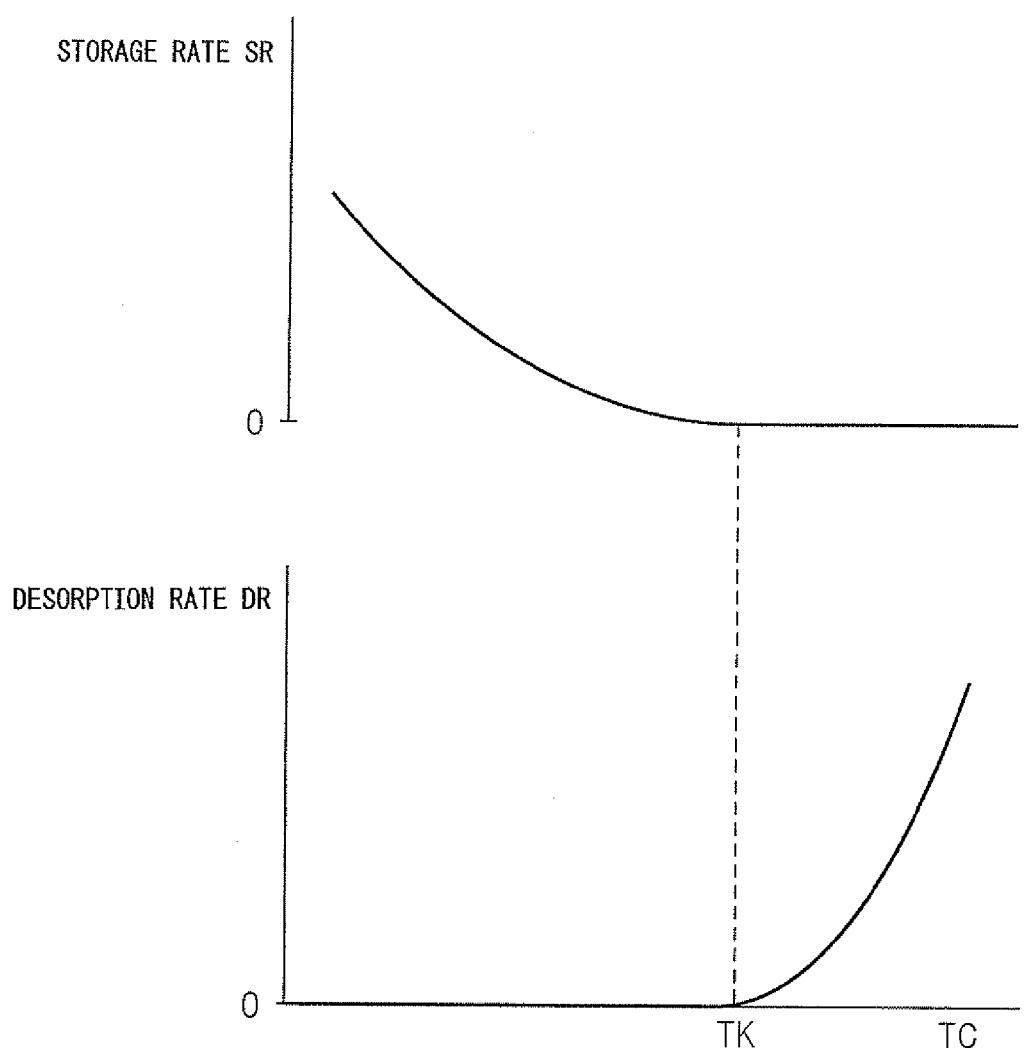
FIG. 22 is a view showing a storage rate SR and desorption rate DR.

In FIG. 22, the storage rate SR shows the ratio of the $NO_x$ which is stored in the basic layer 53 to the $NO_x$ which is contained in the exhaust gas when the $NO_x$ purification action is being performed by the first $NO_x$ purification method. The $NO_x$ which is contained in the exhaust gas matches with the exhausted $NO_x$ amount NOXA shown in FIG. 18, so the $NO_x$ amount which is stored in the basic layer 53 is expressed by the SR·NOXA. As shown in FIG. 22, the storage rate SR decreases as the temperature TC of the exhaust purification catalyst 13 rises. Therefore, the $NO_x$ amount (=SR·NOXA) which is stored in the basic layer 53 becomes smaller the higher the temperature TC of the exhaust purification catalyst 13.

On the other hand, in FIG. 22, the desorption rate DR shows the ratio of the $NO_x$ which is desorbed to the stored $NO_x$ amount SNOX which is stored in the basic layer when the $NO_x$ purification action is being performed by the first $NO_x$ purification method. Therefore, the amount of $NO_x$ which is desorbed from the basic layer 53 is expressed by DR·SNOX. As shown in FIG. 22, the desorption rate DR rapidly rises if the temperature TC of the exhaust purification catalyst 13 exceeds an $NO_x$ desorption start temperature TK determined by the exhaust purification catalyst 13. This $NO_x$ desorption start temperature TK is for example, 400° C. In this embodiment according to the present invention, the stored $NO_x$ amount SNOX is calculated by using these storage rate SR and desorption amount DR.

Figure 23:
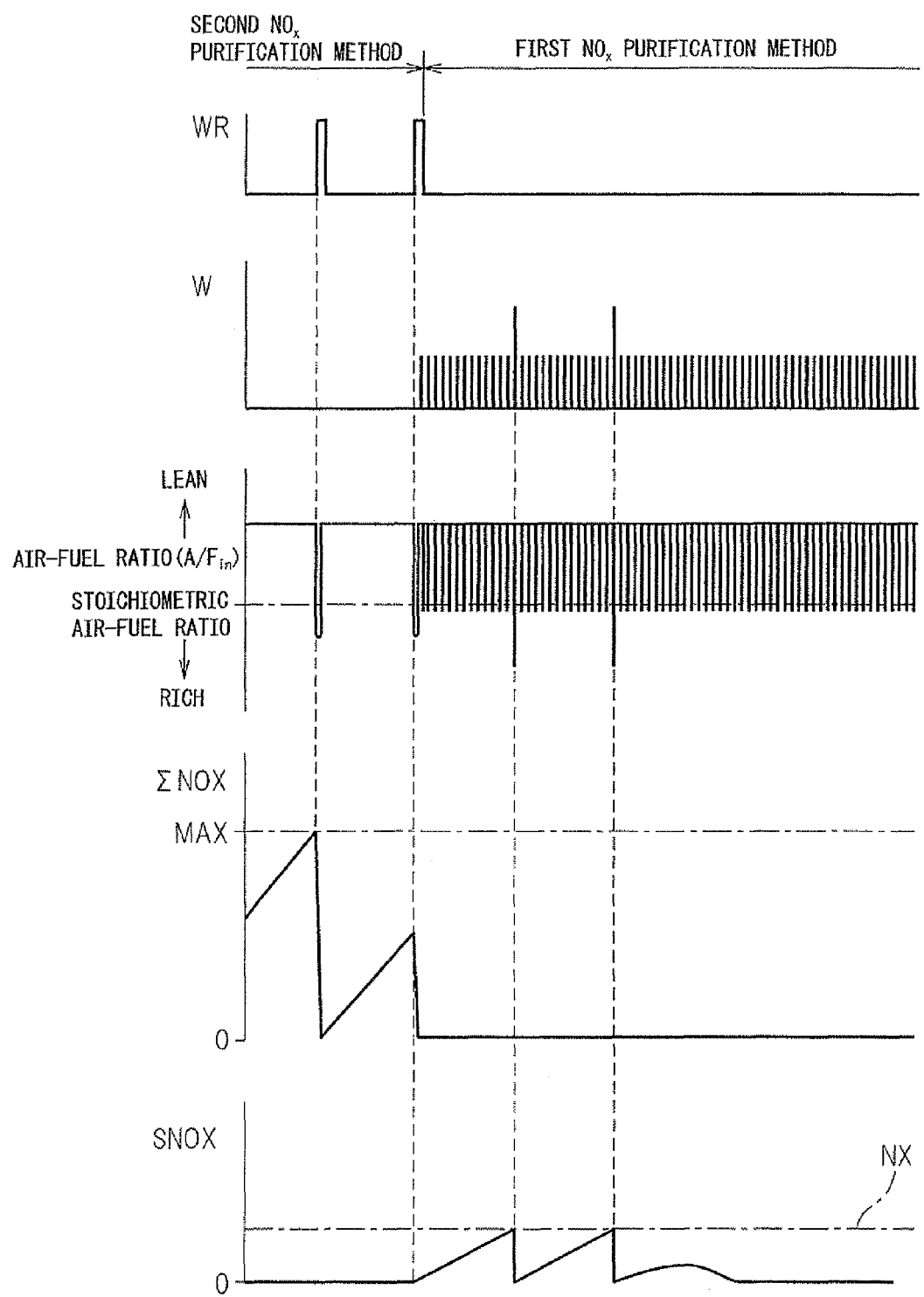
FIG. 23 is a time chart showing $NO_x$ purification treatment as a whole.

Next, referring to FIG. 23, the $NO_x$ purification control according to the present invention as a whole will be explained. Note that, FIG. 23 shows a time chart for the time when, after engine startup, the temperature of the exhaust purification catalyst 13 gradually rises and thereby the second $NO_x$ purification method is switched to the first $NO_x$ purification method. Further, FIG. 23 shows the changes in the injection amount WR of the additional fuel, the amount of feed W of hydrocarbons, and the air-fuel ratio (A/F) in of the exhaust gas flowing into the exhaust purification catalyst 13, the change in the stored $NO_x$ amount ΣNOX of the $NO_x$ which is stored in the exhaust purification catalyst 13 when the second NO purification method is being used, and the change in the stored $NO_x$ amount SNOX of the $NO_x$ which is stored in the basic layer 53 when the first $NO_x$ purification method is being used.

As shown in FIG. 23, when the second $NO_x$ purification method is being performed, if the stored $NO_x$ amount ΣNOX exceeds the allowable amount MAX, additional fuel WR is injected and the air-fuel ratio (A/F) in of the exhaust gas is made rich. Due to this, the $NO_x$ is released from the exhaust purification catalyst 13. On the other hand, when switched from the second $NO_x$ purification method to first $NO_x$ purification method, additional fuel WR is fed to make the stored $NO_x$ amount ΣNOX zero, and the air-fuel ratio (A/F) in of the exhaust gas is made temporarily rich. After this, the $NO_x$ purification treatment by the first $NO_x$ purification method is started.

Right after the $NO_x$ purification treatment by the first $NO_x$ purification method is started, the temperature of the exhaust purification catalyst 13 does not become that high, therefore, at this time, the stored $NO_x$ amount SNOX is gradually increased. Next, if the stored $NO_x$ amount SNOX exceeds the predetermined amount NX, the feed amount W of hydrocarbons is increased and the air-fuel ratio (A/F) in of the exhaust gas is made rich. At this time, the $NO_x$ which is stored in the basic layer 53 is desorbed, and the desorbed $NO_x$ is used so as to form the reducing intermediate.

On the other hand, if, a little after the $NO_x$ purification treatment by the first $NO_x$ purification method is started, the temperature of the exhaust purification catalyst 13 rises, the $NO_x$ will no longer be stored in the basic layer 53 and the stored $NO_x$ will just be desorbed from the basic layer 53. Therefore, at this time, the stored $NO_x$ amount SNOX will not exceed the predetermined amount NX, so the concentration of hydrocarbons will never be temporarily increased and a good $NO_x$ purification action is continued by the first $NO_x$ purification method.

Note that, in FIG. 23, the allowable amount MAX expresses the $NO_x$ storage ability of the exhaust purification catalyst 13. AS opposed to this, the predetermined amount NX expresses an amount far smaller than the $NO_x$ storage ability of the exhaust purification catalyst 13. Therefore, as will be understood from FIG. 23, this predetermined amount NX is a far smaller amount than the allowable amount MAX.

Figure 24:
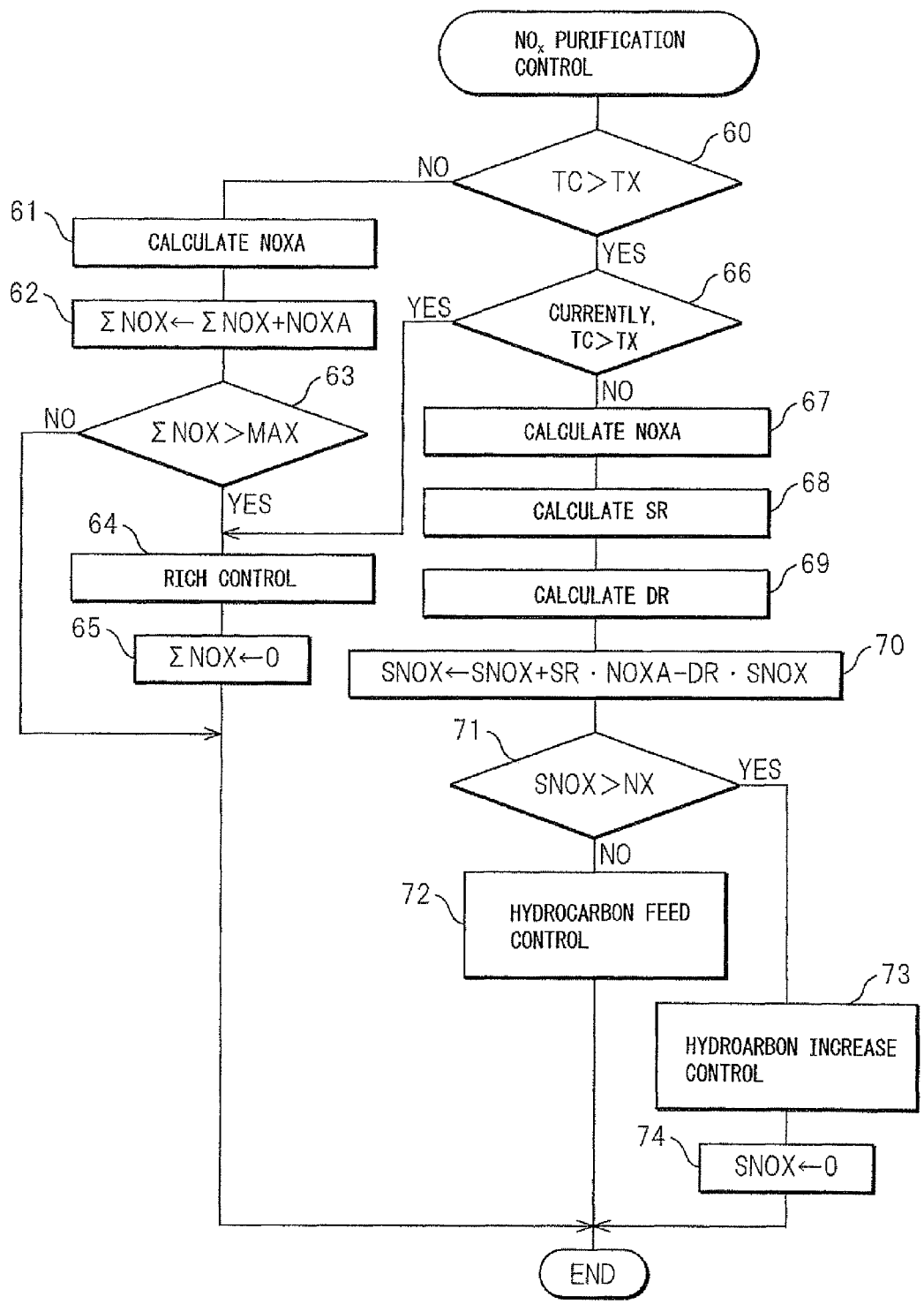
FIG. 24 is a flow chart for $NO_x$ purification control.

FIG. 24 shows the $NO_x$ purification control routine for working this first embodiment. Note that, this routine is executed by interruption every predetermined time.

Referring to FIG. 24, first, at step 60, it is judged if the temperature TC of the exhaust purification catalyst 13 is higher than the activation temperature TC shown in FIG. 5. When TC≤TX, that is, when the $NO_x$ purification treatment cannot be performed well by the first $NO_x$ purification method, the routine proceeds to step 61 where the second $NO_x$ purification method is performed.

That is, at step 61, the $NO_x$ amount NOXA stored per unit time is calculated from the map shown in FIG. 18. Next, at step 62, the next formula is used as the basis to calculate the $NO_x$ amount ΣNOX stored in the exhaust purification catalyst 14 during the $NO_x$ purification action by the second $NO_x$ purification method:

$$\Sigma NOX \leftarrow \Sigma NOX + NOXA - NOXD$$

Next, at step 63, it is judged if the stored $NO_x$ amount ΣNOX exceeds the allowable value MAX. When ΣNOX>MAX, the routine proceeds to step 64 where the additional fuel amount WR is calculated from the map shown in FIG. 20 and the additional fuel injection action is performed. Next, at step 65, ΣNOX is cleared.

On the other hand, when it is determined at step 60 that TC>TX, the routine proceeds to step 66, where it is determined that at the time of the current interruption, TC>TX stands. When it is determined that now TC>TX, to release the residual stored $NO_x$, the routine proceeds to step 64 where additional fuel WR is injected. As opposed to this, when it is judged at step 66 that at the time of the current interruption, TC>TX does not currently stand, meaning that TC>TX has been previously determined to stand in step 66, and thus TC>TX already stands, the routine proceeds to step 67 where the first $NO_x$ purification method is performed.

That is, first, at step 67, the $NO_x$ amount NOXA of the $NO_x$ which is exhausted per unit time is calculated from the map shown in FIG. 18. Next, at step 68, the output signal of the temperature sensor 23 is used as the basis to calculate the storage rate SR from the relationship shown in FIG. 22. Next, at step 69, the output signal of the temperature sensor 23 is used as the basis to calculate the desorption rate DR from the relationship shown in FIG. 22. Next, at step 70, the following formula is used as the basis to update the stored. $NO_x$ amount SNOX of the $NO_x$ which is stored in the basic layer 53.

$$SNOX \leftarrow SNOX + SR \cdot NOXA - DR \cdot SNOX$$

Next, at step 71, it is judged if the stored $NO_x$ amount SNOX exceeds the predetermined amount NX. When SNOX≤NX, the routine proceeds to step 72 where the feed amount W of hydrocarbons is calculated from the map shown in FIG. 16, and the amount W of hydrocarbons is fed from the hydrocarbon feed valve 15 by the period ΔT calculated from the map. At this time, the $NO_x$ purification action is being performed by the first $NO_x$ purification method. As opposed to this, when it is judged at step 71 that SNOX>NX. the routine proceeds to step 73 where the feed amount of hydrocarbons for making $NO_x$ desorb from the basic layer 53 is increased. Next, at step 74, the $NO_x$ storage amount SNOX is cleared.

Next, a second embodiment according to the present invention will be explained. In this second embodiment, when the $NO_x$ purification action is being performed by the first $NO_x$ purification method, the $NO_x$ storage operation state where the $NO_x$ is stored in the exhaust purification catalyst 13 is found in advance. As an example of this $NO_x$ storage operation state, the case where a low speed operation is continued for a constant time or more may be mentioned. In such a case, a predetermined amount NX or more of $NO_x$ can be stored in the exhaust purification catalyst 13. Therefore, in this case, to make the $NO_x$ which is stored in the $NO_x$ exhaust purification catalyst 13 desorb, the concentration of hydrocarbons flowing into the exhaust purification catalyst 13 is temporarily increased by a predetermined period.

That is, in this second embodiment, when the $NO_x$ purification action is being performed by the first $NO_x$ purification method, the concentration of hydrocarbons is made to vibrate with the predetermined range of period ΔT. When the engine operating state is the above $NO_x$ storage operation state, the concentration of hydrocarbons flowing into the exhaust purification catalyst 13 is temporarily increased by a period longer than this predetermined range of period ΔT. Due to this, the $NO_x$ which was stored in the basic layer 53 can be periodically desorbed and therefore a high $NO_x$ purification rate can be secured.

Further, in this second embodiment, as will be understood from FIG. 22, when the temperature TC of the exhaust purification catalyst 13 is lower than the $NO_x$ desorption start temperature TK, the exhaust purification catalyst 13 stores $NO_x$. Therefore, a temperature region lower than the $NO_x$ desorption start temperature TK becomes the $NO_x$ storage temperature region. In this case, if the temperature TC of the exhaust purification catalyst 13 is within this $NO_x$ storage temperature region, a predetermined amount NX or more of $NO_x$ may be stored in the exhaust purification catalyst 13. Therefore, in this case, to desorb the $NO_x$ which is stored in the exhaust purification catalyst, the concentration of hydrocarbons flowing into the exhaust purification catalyst is temporarily increased by a predetermined period.

That is, in this case, when the first $NO_x$ purification method is used for the $NO_x$ purification action, if the temperature TC of the exhaust purification catalyst 13 is in the $NO_x$ storage temperature region, it is judged that the engine operating state is in the above $NO_x$ storage operation state.

Figure 25:
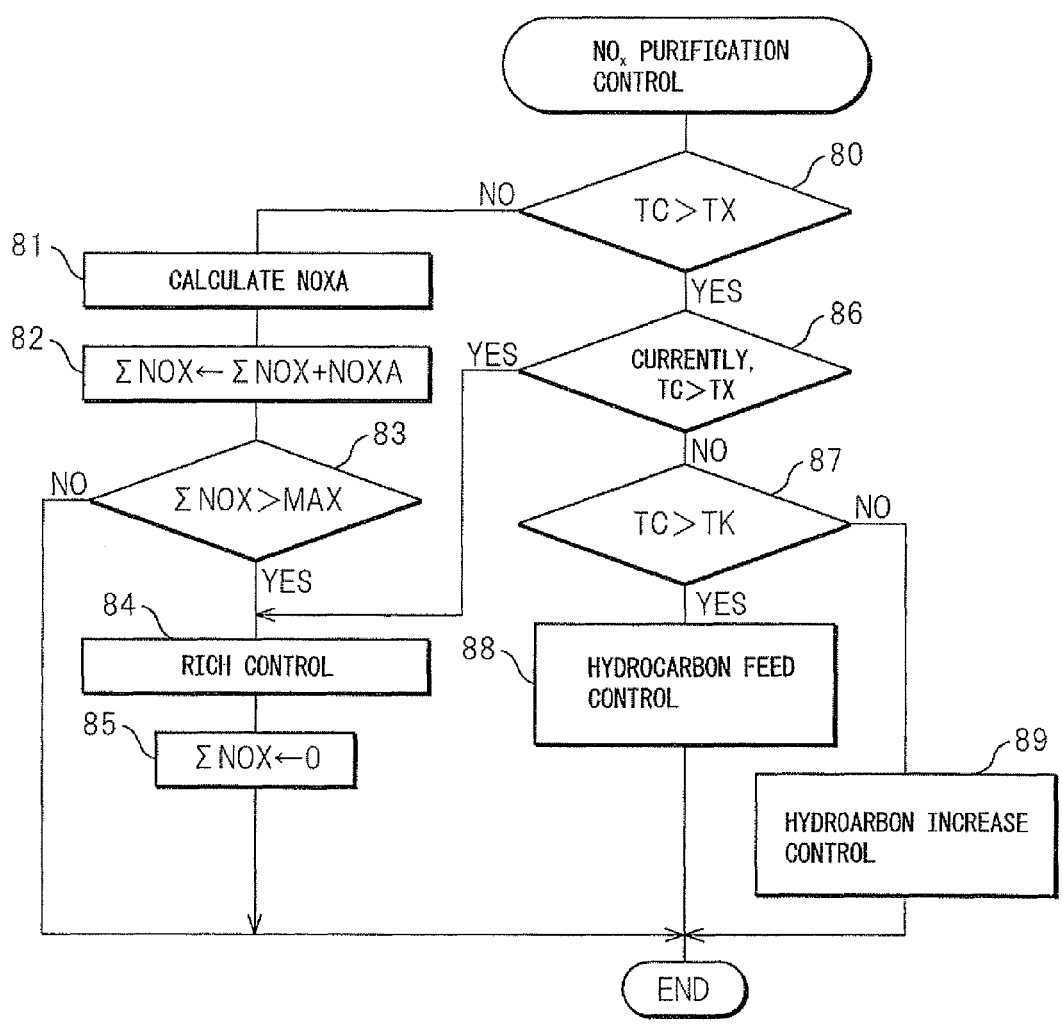
FIG. 25 is a flow chart for $NO_x$ purification control of another embodiment.

FIG. 25 shows the $NO_x$ purification control routine for executing this embodiment. Note that, this routine is also executed by interruption every certain time.

Referring to FIG. 25, first, at step 80, it is judged if the temperature TC of the exhaust purification catalyst 13 is higher than the activation temperature TC shown in FIG. 5. When TC≤TX, that is, when the $NO_x$ purification treatment cannot be performed well by the first $NO_x$ purification method, the routine proceeds to step 81 where the second $NO_x$ purification method is executed.

That is, at step 81, the $NO_x$ amount NOXA stored per unit time is calculated from the map shown in FIG. 18.

Next, at step 82, the next formula is used as the basis to calculate the $NO_x$ amount ΣNOX which is stored in the exhaust purification catalyst 14 for the $NO_x$ purification action by the second $NO_x$ purification method.

ΣNOX←ΣNOX+NOXA−NOXD

Next, at step 83, it is judged if the stored $NO_x$ amount ΣNOX exceeds the allowable value MAX. When ΣNOX>MAX, the routine proceeds to step 84 where the additional fuel amount WR is calculated from the map shown in FIG. 20 and an injection action of additional fuel is performed. Next, at step 85, ΣNOX is cleared.

On the other hand, when it is determined at step 80 that TC>TX, the routine proceeds to step 86, where it is determined that, at the time of the current interruption, TC>TX. When it is determined that now TC>TX, to release the residual stored $NO_x$, the routine proceeds to step 84 where additional fuel WR is injected. As opposed to this, when it is determined at step 86 that at the time of the current interruption, TC>TX does not currently stand, meaning that TC>TX has been previously determined to stand in step 86, and thus TC>TX already stands, the routine proceeds to step 87 where the first $NO_x$ purification method is performed.

That is, first, at step 87, it is judged if the temperature TC of the exhaust purification catalyst 13 is higher than the $NO_x$ desorption start temperature TK. When TC>TK, the routine proceeds to step 88 where the feed amount W of hydrocarbons is calculated from the map shown in FIG. 16, and the amount W of hydrocarbons is fed from the hydrocarbon feed valve 15 by the calculated period ΔT. At this time, the $NO_x$ purification action is being performed by the first $NO_x$ purification method. As opposed to this, when it is judged at step 87 that TC≤TK, the routine proceeds to step 89 where when the $NO_x$ purification action is being performed by the first $NO_x$ purification method, the feed amount of hydrocarbons for making $NO_x$ desorb from the basic layer 53 is temporarily increased by the predetermined period. That is, at this time, the air-fuel ratio (A/F) in of the exhaust gas flowing into the exhaust purification catalyst 13 is made temporarily rich by the predetermined period.

Note that, as another embodiment, in the engine exhaust passage upstream of the exhaust purification catalyst 13, an oxidation catalyst for reforming the hydrocarbons can be arranged.

REFERENCE SIGNS LIST

4 . . . intake manifold
5 . . . exhaust manifold
7 . . . exhaust turbocharger
12 . . . exhaust pipe
13 . . . exhaust purification catalyst
14 . . . particulate filter
15 . . . hydrocarbon feed valve

The invention claimed is:

1. An exhaust purification system of an internal combustion engine, the exhaust purification system comprising:
an exhaust purification catalyst for reacting $NO_x$ contained in exhaust gas and reformed hydrocarbons arranged inside of an engine exhaust passage;
a precious metal catalyst carried on an exhaust gas flow surface of the exhaust purification catalyst;
a basic exhaust gas flow surface part formed around the precious metal catalyst; and
an electronic control unit that is at least configured to control a vibration of a concentration of hydrocarbons flowing into the exhaust purification catalyst within a predetermined range of amplitude and within a predetermined range of period, wherein
when the electronic control unit controls the vibration of the concentration of hydrocarbons within the predetermined range of amplitude and within the predetermined range of period, a reducing intermediate containing nitrogen and hydrocarbons is produced on the precious metal catalyst and held on the basic exhaust gas flow surface part, the $NO_x$ contained in the exhaust gas catalyst is chemically reduced by a reducing action of the reducing intermediate held on the basic exhaust gas flow surface part, the exhaust purification catalyst has a property of chemically reducing the $NO_x$ that is contained in the exhaust gas without storing a substantial amount of nitrates in the basic exhaust gas flow surface part, and when a first predetermined amount or more of nitrates are stored at, or when the first predetermined amount or more of nitrates are estimated to be stored at, the exhaust purification catalyst, the concentration of hydrocarbons flowing into the exhaust purification catalyst is temporarily increased to desorb the nitrates that are stored at the exhaust purification catalyst.

2. An exhaust purification system of an internal combustion engine as claimed in claim 1, wherein an air-fuel ratio of the exhaust gas flowing into the exhaust purification catalyst when the concentration of hydrocarbons is temporarily increased is made rich and smaller than an air-fuel ratio of the exhaust gas flowing into the exhaust purification catalyst when the concentration of hydrocarbons is made to vibrate within said predetermined range of amplitude.

3. An exhaust purification system of an internal combustion engine as claimed in claim 1, wherein an amount of nitrates that is stored in the exhaust purification catalyst is calculated when the concentration of hydrocarbons flowing into the exhaust purification catalyst is made to vibrate within said predetermined range of amplitude and said predetermined range of period and wherein the concentration of hydrocarbons flowing into the exhaust purification catalyst is temporarily increased when the calculated stored nitrate amount exceeds said first predetermined amount.

4. An exhaust purification system of an internal combustion engine as claimed in claim 1, wherein a nitrate storage operation state where nitrates are stored in the exhaust purification catalyst when the concentration of hydrocarbons flowing into the exhaust purification catalyst is made to vibrate within said predetermined range of amplitude and within said predetermined range of period is found in advance and, when an engine operating state is said nitrate storage operation state, the concentration of hydrocarbons flowing into the exhaust purification catalyst is temporarily increased by a period longer than the predetermined range of period.

5. An exhaust purification system of an internal combustion engine as claimed in claim 4, wherein when a temperature of the exhaust purification catalyst is in a nitrate storage temperature region of the exhaust purification catalyst when the concentration of hydrocarbons flowing into the exhaust purification catalyst is made to vibrate within said predetermined range of amplitude and within said predetermined range of period, the electronic control unit determines that an engine operating state is in said nitrate storage operation state.

6. An exhaust purification system of an internal combustion engine as claimed in claim 1, wherein the predetermined vibration period of the hydrocarbon concentration is the vibration period necessary for continued production of the reducing intermediate.

7. An exhaust purification system of an internal combustion engine as claimed in claim 6, wherein said vibration period of the hydrocarbon concentration is 0.3 second to 5 seconds.

8. An exhaust purification system of an internal combustion engine as claimed in claim 1, wherein said precious metal catalyst is comprised of platinum Pt and at least one of rhodium Rh and palladium Pd.

9. An exhaust purification system of an internal combustion engine as claimed in claim 1, wherein a basic layer containing an alkali metal, an alkaline earth metal, a rare earth metal, or a metal which can donate electrons to $NO_x$ is formed on the exhaust gas flow surface of the exhaust purification catalyst and wherein a surface of said basic layer forms said basic exhaust gas flow surface part.

\* \* \* \* \*